(12) United States Patent
Sabbouh

(10) Patent No.: US 7,823,123 B2
(45) Date of Patent: Oct. 26, 2010

(54) SEMANTIC SYSTEM FOR INTEGRATING SOFTWARE COMPONENTS

(75) Inventor: Marwan Sabbouh, Chelmsford, MA (US)

(73) Assignee: The MITRE Corporation, McLean, VA (US)

( * ) Notice: Subject to any disclaimer, the term of this patent is extended or adjusted under 35 U.S.C. 154(b) by 1039 days.

(21) Appl. No.: 11/377,459

(22) Filed: Mar. 17, 2006

(65) Prior Publication Data

US 2006/0206883 A1 Sep. 14, 2006

(51) Int. Cl.
*G06F 9/44* (2006.01)
(52) U.S. Cl. .................................................. 717/106
(58) Field of Classification Search .................. 717/140
See application file for complete search history.

(56) References Cited

U.S. PATENT DOCUMENTS

| | | | |
|---|---|---|---|
| 6,560,633 B1 | 5/2003 | Roberts et al. | |
| 6,847,974 B2 | 1/2005 | Wachtel | |
| 7,146,399 B2 * | 12/2006 | Fox et al. | 709/203 |
| 7,424,701 B2 | 9/2008 | Kendall et al. | |
| 2003/0101170 A1 | 5/2003 | Edelstein et al. | |
| 2003/0120665 A1 * | 6/2003 | Fox et al. | 707/100 |
| 2003/0163450 A1 * | 8/2003 | Borenstein et al. | 707/1 |
| 2003/0163597 A1 | 8/2003 | Hellman et al. | |
| 2003/0167445 A1 | 9/2003 | Su et al. | |
| 2003/0172368 A1 | 9/2003 | Alumbaugh et al. | |
| 2004/0054690 A1 | 3/2004 | Hillerbrand et al. | |
| 2004/0083199 A1 | 4/2004 | Govindugari et al. | |
| 2004/0093344 A1 | 5/2004 | Berger et al. | |
| 2004/0126840 A1 * | 7/2004 | Cheng et al. | 435/69.1 |
| 2004/0216030 A1 | 10/2004 | Hellman et al. | |
| 2004/0230636 A1 | 11/2004 | Masuoka et al. | |
| 2004/0243595 A1 | 12/2004 | Cui et al. | |
| 2005/0138634 A1 | 6/2005 | Luty et al. | |
| 2006/0015843 A1 | 1/2006 | Sabbouh | |
| 2006/0173868 A1 | 8/2006 | Angele et al. | |
| 2008/0168420 A1 | 7/2008 | Sabbouh | |

OTHER PUBLICATIONS

"Discovering Direct and Indirect Matches for Schema Elements", Li Xu et al., In 8th International Conference on Database Systems for advanced Applications, Mar. 26-28, 2003.*
Sabbouh, M., "Semantic Integration of the C2 Enterprise," Boston Knowledge Management Forum, Mar. 17, 2005. (Available at http://www.kmforum.org/content/Sabbouh_2005-v2-msm-tokmf.ppt).
Sabbouh, M., "Semantic Integration of C2 Enterprise," MITRE Corp., Apr. 28, 2004. (Available at http://www.mitre.org/news/events/tech04/briefings/1526.pdf).

(Continued)

*Primary Examiner*—Wei Y Zhen
*Assistant Examiner*—Lanny Ung
(74) *Attorney, Agent, or Firm*—Sterne, Kessler, Goldstein & Fox PLLC

(57) ABSTRACT

A system and method for integrating databases and/or web services into a searchable ontological structure. The structure allows free-form searching of the combined system, discovering an execution path through the ontology to provide answers to queries that may require accessing multiple systems to resolve, without a need for knowledge of the available databases and services or of query syntax by the user. The same technologies that integrate databases and web services into a single ontological structure may also provide interoperability between the numerous information systems within modern enterprises. Context ontologies are constructed to capture ubiquitous enterprise concepts and their representations across the enterprise. By mapping information system data models to these context ontologies, information that originates in one part of the enterprise may be used across the enterprise in a highly automated fashion.

19 Claims, 26 Drawing Sheets

OTHER PUBLICATIONS

Berners-Lee, et al., "The Semantic Web," Scientific American, May 2001 (available at http://www.sciam.com/print_version.cfm?articleID=00048144-10D2-1C70-84A9809EC588EF21).

Crubezy, M., et al., "Mediating knowledge between application components", Semantic Integration Workshop of the Second International Semantic Web Conference (ISWC-03), Sanibel Island, Florida, CEUR, 82. 2003 (available at http://smi-web.stanford.edu/pubs/SMI_Reports/SMI-2003-0978.pdf).

Daconta, et al., The Semantic Web: A Guide to the Future of XML, Web Services, and Knowledge Management, Wiley US, Jul. 2003.

Duane Merrill, "Mash ups: The new breed of Web app An introduction to mash ups", Published Aug. 8, 2006, retrieved from<http://www.ibm.com/developerworks/xml/library/x-mashups.html>, total pages: 10.

Gruber, T.L., "A translation approach to portable ontologies", Knowl. Acquis., 5, 199-220 (1993).

Guarino, et al., "Ontologies and Knowledge Bases: Towards a Terminological Clarification," in Towards Very Large Knowledge Bases: Knowledge Building and Knowledge Sharing, N. Mars, (ed.), IOS Press, Amsterdam, 1995 (available at http://www.loa-cnr.it/Papers/KBKS95.pdf).

Herrera, X., "The bottom line for accurate massed fires: common grid," Field Artillery Journal, Jan.-Feb. 2003, 5-9 (2003).

Hobbs, J., "A DAML ontology of time", 2002 (available at http://www.cs.rochester.edu/~ferguson/daml/daml-time-nov2002.txt).

National Imagery and Mapping Agency (NIMA) USA, GEOTRANS 2.2.4-Geographic Translator (available at http://earth-info.nima.mil/GandG/geotrans/).

Obrst et al., "Ontologies for Coporate Web Applications", Nov 3, 2003, retrieved from <www.aaai.org/ojs/index.php/aimagazine/article/download/...11616>, pp. 49-62.

Obrst et al. "Frameworks for semantics in web services workshop", Jun. 10, 2005, retrieved from <http://www.w3.org/2005/04/FSWS/Submissions/35/MITREpositionpaperV1.4.pdf>, total pages: 8.

OWL-S: Semantic Markup for Web Services (available at http://www.w3.org/Submission/OWL-S/, Nov. 2004).

OWL-Services (OWL-S) effort (available at http://www.daml.org/services/owl-s/1.0).

Sabbouh et al., "Using Semantic web technologies to integrate software components", Proceedings fo the ISWC 2004, Workshop on Semantic Web Services, retrieved from <http://ftp.informatik.rwth-aachen.de/Publications/CEUR-WSNol-119/paper8.pdf>, total pages: 15.

Sabbouh, M and DeRosa, J.K., "Using Semantic Web Technologies to Integrate the Enterprise," Proceedings of the Third International Semantic Web Conference (ISWC 2004), Nov. 2004 (available at http://www.mitre.org/work/tech_papers/tech_papers_04/derosa_semantic/deros a_semantic.pdf).

Sabbouh, M. and Pulvermacher, M.K., "Wedding the Web: An Example of a Services and Semantics Marriage that Works", MITRE Corp., Jun. 2004 (available at http://www.mitre.org/work/tech_papers/tech_papers_04/sabbouh_web/sabbouh_web.pdf).

Sabbouh, M., "Semantic Integration of C2 Enterprise," MITRE Corp., Mar. 17, 2005. (available at http://www.mitre.org/news/events/tech04/briefings/1526.pdf).

Sabbouh, M., et al., "Using Semantic Web Technologies to Enable Interoperability of Disparate Information Systems," MITRE Corp., Sep. 2005 (available at http://www.mitre.org/work/tech_papers/tech_papers_05/05_1025/05_1025.pdf).

Semy, S.K., et al., "Towards the Use of an Upper Ontology for U.S. Government and U.S. Military Domains," MITRE Technical Report 04B0000063, MITRE Corp., Sep. 2004 (available at http://www.mitre.org/work/tech_papers/tech_papers_04/04_0603/04_1175.pdf).

Smith, B., "Ontology," in Blackwell Guide to the Philosophy of Computing and Information, L. Floridi (ed.), Oxford: Blackwell, 2003, 155-156 (available at http://ontology.buffalo.edu/smith/articles/ontology_pic.pdf).

Universal Description, Discovery and Integration (UDDI) (available at http://www.uddi.org/specification.html).

Web Service Modeling Ontology (WSMO) (available at http://www.w3.org/Submission/WSMO/, Jun. 2005).

Web Services Description Language (WSDL) available at http://www.w3.org/2002/ws/desc).

World Wide Web Consortium (W3C) proposed recommendation for a standard web ontology language (OWL) (available at http://www.w3.org/TR/2004/REC-owl-features-20040210).

\* cited by examiner

```
Input=Instance in AM domain; Output=Class in AO domain
Child-Concepts= method-process-instance ("COORD: 21 N 20678076 5423265", Output, 1);

method-process-instance (Input-Instance, Output, FLAG)
{
Child-Parent-Concept= NULL;
X= Get Full Def of (Output);    C(i)= All-Triples (X);

if (C(i) != NULL)
  {
    For each i in C(i)
    {
       o(i)= Object-value ( C(i) );
       r(i)= Relation (C(i));
       if (r(i) == hasMatchingValue)
       {
             Value-instance(n)= DPQ( Input-instance, o(i) )
               Return Value-instance( );
       }
       else if (r(i) == hasMatch || sameAs )
       {
             Value-instance(n)= DPQ(Input-instance, o(i) ) Exclude links:
              hasMatch, hasInput , hasOutput, hasContext, and isTheContextOf
             Child(n)= IIQ(value-instance(n), Output)
             Return Child ();
       }
        else if {r(i) == hasContext || isTheContextOf || isAgentOutputOf || isOutputOf)         { do
       nothing;}
        else {
             Child()=method-process-instance ( o(i), 0 );
             If ( FLAG== 0 )
             {
                   For each j in Child(j){
                       if( Child(j) != Null){
                            if (Child-Parent-concept(j)==NULL){
                                 Child-Parent-concept(j)= New KN
                                     Assert Child-Parent-concept(j) subClassOf
                                     Concept
                            }
                            Assert Child (j)   subClassOf    o(i)
                            Assert Child-Parent-concept(j) r(i)   Child(j);

}
                  }
                  Else
                  {
                       For each j in Child(j){
                           if( Child(j) != Null){
                               if (Child-Parent-concept(0)==NULL){
                                   Child-Parent-concept(0)= New KN
                                   Assert Child-Parent-concept(0) subClassOf  Concept
                               }
                               Assert Child (j)   subClassOf    o(i)
                               Assert Child-Parent-concept(0) r(i)   Child(j);
                           }
                      }

}
         }
      i = i+1;
      }// end for each i
  }// end c(i)!= Null
Return Child-Parent-concept ();
}// end method
```

Figure 24

SEMANTIC SYSTEM FOR INTEGRATING SOFTWARE COMPONENTS

STATEMENT REGARDING FEDERALLY-SPONSORED RESEARCH AND DEVELOPMENT

The U.S. government has a paid-up license in this invention and the right in limited circumstances to require the patent owner to license others on reasonable terms as provided for by the terms of Contract No. FA8721-05-C-0001 awarded by the United States Air Force.

BACKGROUND OF THE INVENTION

Field of the Invention

The present invention relates to a system for integrating software components using a semantic ontology management system. The present invention further relates to a system for integrating disparate, information systems into a service-oriented architecture to provide data interoperability across an enterprise.

Web service standards are enjoying widespread adoption in corporations across many industries. Corporations are recognizing the value of making it easier for other applications to consume their data by using web standards such as the Hyper Text Transfer Protocol (HTTP), web addressing, and Extensible Markup Language (XML). Using these standards, software clients written in one programming language can access and retrieve information from a server, irrespective of the technology (e.g., hardware, operating system, and programming language) that the server uses.

However, even with the adoption of these web standards, problems remain. For example, although XML is mature as a syntax for web data exchange, current XML technologies do not supply the capabilities provided by more mature technologies like relational database systems. Also, while solutions that aid in web service discovery (e.g., Universal Description, Discovery and Integration (UDDI) as and invocation (e.g., Web Services Description Language (WSDL) are emerging, they are far from mature. Similarly, technologies that reason with web service description files for the purpose of chaining web services are not available. It is left to the programmer to determine, at design time, which web services to invoke, the order in which they need to be invoked, and the formatting of information necessary to complete an operation. As a result, the programmer writes much of the "glue code" necessary for a particular computation. A need still exists for methods and systems that allow automatic generation of such "glue code," as well as automatic discovery and integration of available web services and data repositories.

Further, large enterprises are moving towards a service-oriented architecture strategy to make data repositories and web services from one part of the enterprise available for use in another part. However, these service-oriented architectures often fail to address the semantics of individual information systems. The representation of position on a particular information system may lack a reference datum, and hence, position data one information system may not be easily accessed and utilized by other information systems. Another example of such a semantic mismatch is the representation of time on an individual information system, which may lack the essential designation of a time zone. The failure of service-oriented architectures to recognize and address data semantics and semantic mismatches leads not only to execution errors, but also to lengthy testing and integration cycles that find and correct the resulting errors (see Herrera, X., "The bottom line for accurate massed fires: common grid," *Field Artillery Journal*, pg. 5-9, January-February 2003, which is incorporated herein by reference).

Existing web service standards are unable to address fully the issues facing modem enterprises during the integration of disparate information systems. Common semantic markup languages (e.g., OWL-S: Semantic Markup Language for Web Services) are not sufficiently broad to offer a solution, and existing semantic frameworks (e.g., Web Service Modeling Ontology (WSMO) are not sufficiently general to address the integration needs imposed by emerging behavior. Further, existing sets of OWL/RDF mappings are likewise insufficiently broad to address the changing needs of the integration process (e.g., Crubezy, et al., "Mediating knowledge between application components", Semantic Integration Workshop of the Second International Semantic Web Conference (ISWC-03), Sanibel Island, Fla., CEUR, 82.2003, incorporated herein by reference). It is left to the programmer at the time of integration to determine the semantic and contextual mismatches that exist between data representations on multiple information systems, resolve these mismatches, and generate the code that integrates the various information systems across the enterprise. Thus, a need exists for methods and systems to automatically integrate the disparate information systems into a service-oriented architecture that provides data interoperability across the enterprise.

BRIEF SUMMARY OF THE INVENTION

In one aspect, the invention is a method of generating executable code for linking data in a structured data repository to structured inputs and outputs from a source web service. According to the method, a first domain ontology encoding the structured data repository and a second domain ontology encoding the structured inputs and outputs of the source web service (and optionally also access parameters for the web service) are provided, and are linked to form a merged ontology. Data from the structured data repository and the web service are mapped into the merged ontology to create an expanded ontology. One or more desired input(s) and output(s) are specified for a linked web service, and the expanded ontology is searched for an execution path between the desired input(s) and output(s), which may include at least one concept from the first ontology and one concept from the second ontology. Executable code is then generated that executes steps of the execution path in order to produce the desired outputs. The expanded ontology may be created either by mapping data from the structured data repository and structured inputs and outputs from the web service into the merged ontology, or into the first domain ontology and second domain ontology before merging.

In another aspect, the invention is a method of constructing a new web service that provides a selected output type in response to a selected input. The method includes accepting an input item and an output type from a user, and searching an ontology to find one or more input matches for the input item and output matches for the output type. The ontology comprises structured data from one or more structured data repositories and structured input and output information from one or more existing web services. Once match(es) for the input item and output type are found, the ontology is searched to find execution path(s) that link input match(es) and output match(es). (If multiple execution paths are found, a user may be permitted to select a desired path, and if multiple input and/or output matches are found, a user may also be permitted to select among the matches found). The execution path is then used to generate executable code for the new web service, which allows a user to provide input of a type corresponding to the accepted input item, and provides an output of the accepted output type. The execution path may include at least one concept from a structured data repository and at least one concept from structured input and output information from an existing web service.

In yet another aspect, the invention is a method of selecting and accessing one or more web services, wherein each web service has a set of one or more structured input(s) and output(s). The method includes providing a domain ontology that includes mappings to the structured input(s) and output(s) (and optionally access parameters for a web service in the ontology), specifying one or more desired inputs and outputs, and searching the domain ontology to match the one or more desired inputs and outputs. The domain ontology is also searched for an execution path linking the one or more structured inputs to the one or more structured outputs. The web service(s) having mappings on the execution path are then returned to a user. When a plurality of web services is returned, the web services may form a chain in which a structured output of one web service provides a structured input for another web service.

In still another aspect, the invention comprises a method of mapping a web service having a set of one or more structured input(s) and one or more structured output(s) to a domain ontology. The method includes identifying an input type for each of the structured input(s), searching the ontology for concepts having each input structure type and adding mappings between the structured inputs and the located concepts in the ontology, and searching the ontology for concepts having each output structure type and adding mappings between the structured outputs and the located concepts in the ontology. A concept is then added to the ontology representing the web service and adding mappings between the added concept, the structured inputs, and the structured outputs. In addition, access parameters for the web service may be added. The ontology may also include concepts and relationships derived from one or more structured data repositories.

In a further aspect, the invention is a software tool for accessing a structured data repository and a source web service having structured inputs and outputs. The tool includes a searchable ontology structure, an interface for a user to specify one or more input items and one or more output types, a search module that searches the searchable ontology for an execution path linking the specified input item(s) and output type(s), and a query module that traverses the execution path to provide output of the output type(s) that is linked to the input item(s) in the ontology. The searchable ontology structure includes concepts and relationships from a selected knowledge domain, concepts and relationships of the structured data repository, and concepts and relationships of the structured input(s) and output(s) of the web service. The concepts and relationships of the structured data repository and of the web service are linked to the concepts and relationships from the selected knowledge domain, and the execution path may include concepts from both the structured data repository and the web service. The tool may also include a code generation module that generated executable code that carries out the execution path, and/or a selection module that allows a user to select among a plurality of execution paths.

In yet a further aspect, the invention is a method of generating executable code for linking data instances on a source information system to corresponding data instances on one or more distinct target information systems throughout an enterprise. The method includes providing two or more distinct information systems, each information system containing an information system ontology and a corresponding information system data model (and optionally including an associated web service). Further, the method provides a context ontology that captures common concepts and their representations in the distinct information system ontologies, and these context ontologies may capture at least one of the commonly held Position, Time, Types of Things, Geometric Shapes, Roles, Status, or Units of Measure concepts. The method also provides a domain ontology describing the one or more structured inputs and outputs on a translator web service. Concepts from each of the information system ontologies are mapped to the context ontology and to corresponding concepts in each of the other information system ontologies. The structured inputs and outputs of the translator web service ontology are also mapped to the context ontology. The method further provides a service agent to interpret these mappings and to reason with mapped ontologies (potentially an Ontology Mapper, an Onto-Mapper, or a Mapping Interpreter). One or more input data instances from a source information system and one or more output concepts from a target information system are specified for the translator web service, and the mapped ontologies are searched for execution paths between the desired inputs and outputs. The search for execution paths may proceed by first mapping the source information system data model onto its corresponding ontology, and then by invoking the translator web service to return execution paths between the specified inputs and outputs. The translator web service may return execution paths by first determining initial execution paths between specified inputs and outputs, and then by invoking a service agent to discover and resolve the resulting mismatches between the source and target information systems. Initial execution paths may be determined through the application of graph traversal algorithms such as Direct Path Query (DPQ) and Incoming Intersection Query (IIQ). The service agent (which may be automatically invoked by the translator web service) may resolve any combination of contextual or semantic mismatches. Executable code then is generated to invoke the steps of the returned execution path and to create the corresponding output data instance in the specified target information system. The executable code may first invoke the execution paths returned by service agent to obtain a target concept that contextually matches a source data instance, and then reason with the concept representations on the target information system ontology to create a target data instance.

BRIEF DESCRIPTION OF THE FIGURES

The invention is described with reference to the several figures of the drawing, in which:

FIG. 24 is an example algorithm which creates a new data instance on the AO information system domain and links that data instance to corresponding AM data.

DETAILED DESCRIPTION OF THE INVENTION

Definitions

As used herein, a "web service" is an application program (for example, a program implemented in Java or PHP on the World Wide Web) that accepts defined input(s) and returns defined output(s), and that exposes its interface, for example using Web Services Definition Language (WSDL). Example web services include the map servers found at MapQuest™ and Yahoo! Maps™, online telephone directories such as Switchboard.com™, and online weather services such as Weather.com™ and the National Weather Service site at http://www.nws.noaa.gov/. While the web services discussed in the specification are available on the World Wide Web, the term "web service" is also intended to include services accessible only on internal intranets (such as an employee "facebook" or directory) or on standalone computers (such as an XML front end to a database or application program).

As used herein, a "database" or "structured data repository" is a collection of data having a formalism (i.e., structured data). Databases may be organized into "tables" of "records" having "fields" as is conventional in the art (see, e.g., *Webster's New World Dictionary of Computer Terms*, 4th ed., Prentice Hall, New York, 1992), or may be more loosely structured (e.g., a structured text file or a tagged file format document).

Figure 1:
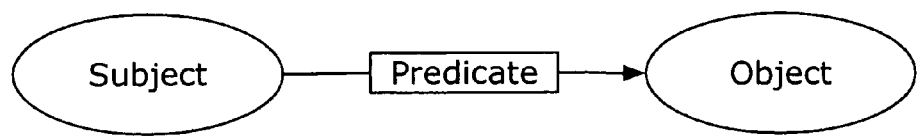
FIG. 1 is a generic "triple" showing the relationship conveyed in graphs shown in this document.

As used herein, a "triple" or "RDF triple" is a statement that conveys information about a resource, and that can be represented as a subject, a predicate, and an object. As depicted herein, a triple is graphically represented as shown in FIG. 1, wherein subject and object nodes are connected by a directional line representing the predicate. An example statement that could be represented as a triple might be "the book *Moby Dick* (subject) has an author (predicate) whose value is Herman Melville (object)." Subject, predicate, and object can all be identified by uniform resource identifiers (URIs), such as a uniform resource locator (URL). Predicates are generally properties of resources, while subjects and objects may be described as "concepts."

As used herein, an "ontology graph" or simply a "graph" is a collection of related triples that together convey information about the relationships between the concepts represented by the nodes of the graph (the set of objects and subjects of the statements represented by the triples).

As used herein, an "ontology" or "domain ontology" is a dictionary of terms within a given domain of knowledge, formulated in a known syntax and with commonly accepted definitions, including relationships between the terms (e.g., in the form of triples or an ontology graph).

Semantic Web Technologies

Today, Semantic Web technologies are beginning to emerge with promises of enabling a much faster integration of applications and data (see, e.g., Gruber, "A Translation Approach to Portable Ontologies," J. Knowledge Acquisition, 5(2):199-200, 1993; Guarino, et al., "Ontologies and Knowledge Bases: Towards a Terminological Clarification," in Towards Very Large Knowledge Bases: Knowledge Building and Knowledge Sharing, N. Mars, ed., IOS Press, Amsterdam, 1995; Berners-Lee, et al., "The Semantic Web," Scientific American, May 2001; and Daconta, et al., The Semantic Web: A Guide to the Future of XML, Web Services, and Knowledge Management, Wiley U S, July 2003, all of which are incorporated by reference herein). However, for that to happen, Semantic Web technologies must facilitate access to large amounts of data with minimal programmer intervention. Web services must be discovered, chained, and invoked automatically, thus relieving the programmer from having to do these steps. Semantic Web standards provide a rich framework for the precise description of data and applications, thereby enabling greater automation in this end-to-end web service execution process. The World Wide Web Consortium (W3C) proposed recommendation for a standard web ontology language (OWL), builds on web technologies including XML's ability to define customized tagging schemes and RDF's flexible approach to representing data.

Convergence between web services and Semantic Web technologies is beginning, as illustrated by the OWL-Services (OWL-S) effort. OWL-S is an effort to develop a web service ontology that could be used to describe the properties and capabilities of web services in unambiguous, computer-interpretable form.

According to the invention, such Semantic Web technologies can be used to discover execution paths spanning the retrieval of data from structured data repositories and execution of web services, to automate the integration of data repositories and web services, and to automatically generate the "glue code" needed to achieve the integration. The example described below shows how a marriage of web services and Semantic Web technologies can further automate this integration process. OWL-S represents a partial solution that can be used according to the invention to orchestrate web services. The example also illustrates how databases can be mapped into ontologies according to the invention, thus making their data available to web services.

An information system will need the capability to integrate new and existing services, e.g., application programs or web services, and incorporate additional information resources, e.g., relational databases or XML documents. In most cases application programs and web services require access to information contained within a data source. Very often the challenge for IS systems is to integrate existing data sources with application programs or web services. The use of IS ontologies and an ontology management system according to the invention can enable this type of integration by generating the integration code automatically.

The existing OWL-S web service ontology model provides features for invoking and accessing web services. However OWL-S does not address the need for web service integration and interaction with an existing database without first building a web service that abstracts the database. The invention provides a methodology to enable the integration of new web services with existing databases.

By representing databases and web services in ontology space and by linking them to the domain ontology, we can now integrate with existing databases, and other web services, without developing additional code. Using IS ontologies in this way not only results in code being generated, but also eliminates the need for creating a web service ontology with composite processes comprised of control flow constructs as defined in OWL-S.

The same Semantic Web technologies that integrate databases and web services into a single ontological structure may also be used to provide interoperability between the numerous information systems within modern enterprises. Typically, communities of interest (COI) within an enterprise develop information models with shared semantics and consistent representations of associated data and web services. In an effort to address emerging behavior, these large enterprises are moving towards a service-oriented architecture strategy that provides data and web service interoperability between the various communities of interest within the enterprise.

Building on the semantic framework described above, the invention uses Semantic Web technologies to integrate disparate information systems into a service-oriented architecture using OWL/RDF ontologies as well as OWL/RDF mapping relations. Individual information system domain ontologies still represent information system data models. However, our approach is no longer dependent on building domain ontologies in the Gruber sense. Ontological characterizations of the individual community-of-interest data and web service (WS) models are introduced to facilitate data interoperability across the enterprise. Further, the invention leverages ubiquitous enterprise concepts like Position, Time and Types of Things (What, When and Where) and builds a context ontology for each that relates all the various representations across the enterprise. The example described below illustrates how context ontologies can integrate the disparate information system ontologies across a large enterprise into a single structure providing data interoperability to each community of interest.

Although the concepts of Position, Time and Types of Things are ubiquitous across the enterprise, each concept may have a different representation within each community of interest or information system. By using OWL/RDF mappings to relate information system domain ontologies to context ontologies, we are able to resolve such representational differences. Additional OWL/RDF mappings between information system ontologies resolve structural and syntactic mismatches between individual concepts. Further OWL/RDF mappings associate web services with ontologies in a fashion identical to that used when integrating web services into ontological structures within a single information system. The invention provides a methodology to automate the interoperability of disparate information systems by reasoning over the set of information system ontologies, the context ontologies, and their associated OWL/RDF mappings. The reasoning process results in workflow discovery, automatic web service invocation, and reconciliation of mismatches.

The invention is described below with reference to particular examples such as integrating a database with a web service, and "chaining" multiple web services. However, those of ordinary skill in the art will readily see that the inventive techniques may be used in a variety of ways, including rapidly integrating pluralities of legacy databases and/or web services into new systems without a need for extensive programming, and selecting appropriate web services from within an ontology without a need for user familiarity with the available web services. Further, the invention may be used not only with an "ontology viewer" to process individual user queries, but may also be used to construct custom Information System (IS):web/database services that access underlying databases and web services as needed to process queries.

The invention is further described by additional examples, such as the integration of multiple, disparate information systems using a number of context ontologies and a translator web service. Those of ordinary skill in the art will readily see that the inventive techniques may be used in a variety of ways, including the rapid integration of both additional information systems and additional context ontologies into an existing semantic framework without a need for extensive programming. Further, the invention may be easily generalized to return a number of potential output workflows corresponding to a specified given plurality of input data instances on a number of information systems.

EXAMPLE 1

Integrating Databases and/or Web Services Into a Searchable Ontological Structure The following example shows how an address database and a map-finding web service (e.g., the map services available at MapQuest™ and Yahoo!™) may be integrated according to the invention, by performing the following steps:

Provide a domain ontology

Create and link a database component ontology to the domain ontology

Create and link a web service component ontology to the domain ontology

Broker a user request to suggest executable paths

Figure 2:
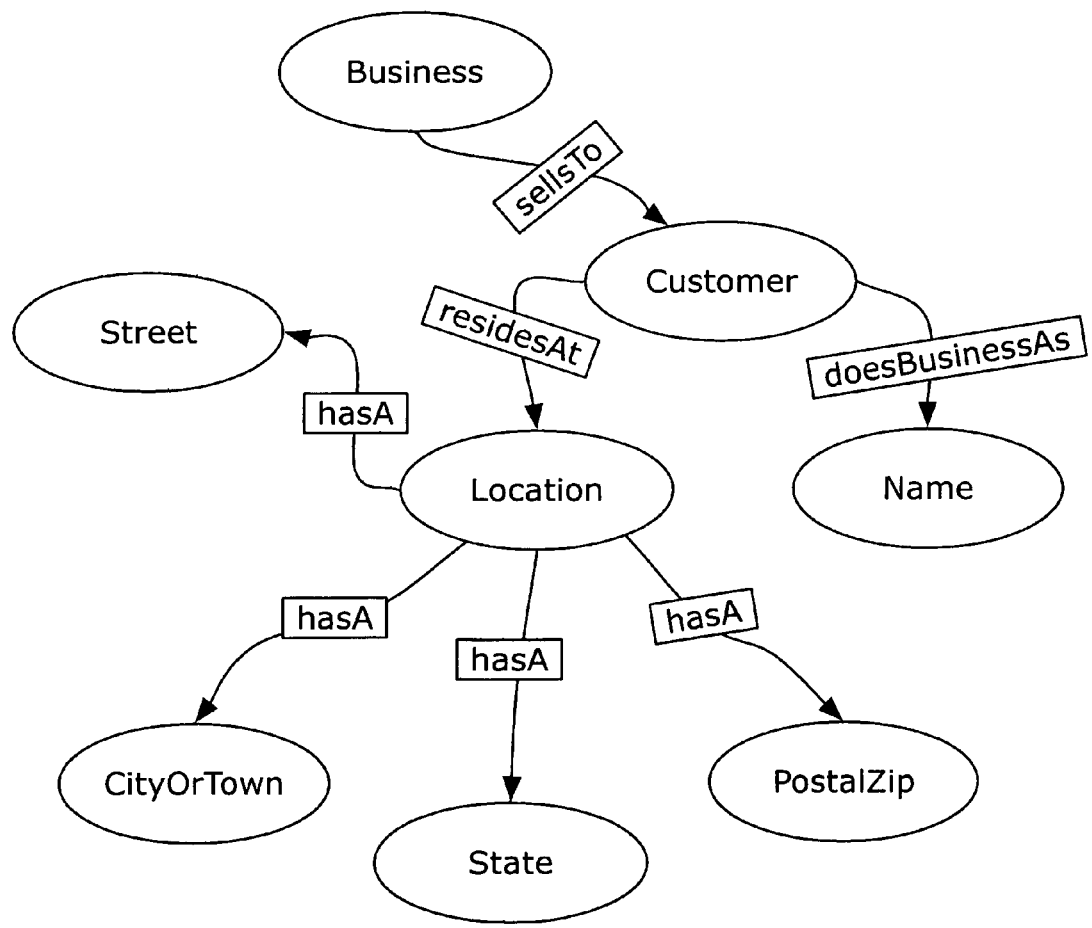
FIG. 2 is a domain ontology for an address domain.

Manually view the result of implementing one of the executable paths through the augmented ontology or automatically generate a web service to do so The domain ontology, D, includes the RDF classes Business, Customer, Name, Location, Street, CityOrTown, State, and PostalZIP. D is represented as a uniform structure of triples, {subject, relationship, object}, as shown in Table 1. This ontology may also be represented graphically, as shown in FIG. 2. (Note that the domain ontology may include other classes and relationships; for simplicity, only seven triples from the ontology are shown).

TABLE 1

D:: {Business, sellsTo, Customer}
D:: {Customer, doesBusinessAs, Name}
D:: {Customer, residesAt, Location}
D:: {Location, hasA, Street}

TABLE 1-continued

D:: {Location, hasA, CityOrTown}
D:: {Location, hasA, State}
D:: {Location, hasA, PostalZIP} sellsTo, doesBusinessAs, and residesAt are OWL object properties, and hasA is an OWL datatype property with domain rdf:Class and range datatype string. As shown, this domain ontology is manually created, typically by experts in the business domain to which it pertains. It may be possible to automatically create useful domain ontologies using artificial intelligence techniques or other methods; such ontologies may also be used according to the invention.

A database ontology R is then constructed for linking to the domain ontology D to form an augmented ontology $D^+$. R is the conjunction of a database upper ontology $R^U$ specifying the structure, algebra, and constraints of the database, and a database lower ontology $R^L$ including the data as instances of $R^U$, as follows.

The upper ontology $R^U$ specifies the structure, algebra and constraints of any relational databases in RDF/OWL triples. We define the RDF classes Database, Relation, Attribute, PrimaryKey and ForeignKey. A portion of $R^U$ is given in Table 2:

TABLE 2

$R^U$::{Database, hasRelation, Relation}
$R^U$::{Relation, hasAttribute, Attribute }
$R^U$::{PrimaryKey, subClassOf, Attribute }
$R^U$::{ForeignKey, subClassOf, Attribute } where hasRelation and hasAttribute are OWL object properties, and subClassOf is defined in the RDF schema (available at http://www.w3.org/TR/rdf-schema/).

Consider a database having a table ADDRESS as depicted in Table 3. (For brevity, only two of the data records are shown). The relation ADDRESS has Address_ID as the primary key, and Name, Street, City, State, and Zip as attributes. The portion of $R^L$ corresponding to this table may then be constructed (in part) as shown in Table 4.

TABLE 3

| Address_ID | Name | Street | City | State | Zip |
|---|---|---|---|---|---|
| 001 | The MITRE Corporation | 202 Burlington Road | Bedford | MA | 01730 |
| 002 | XYC, Inc. | 255 North Road | Chelmsford | MA | 01824 |

TABLE 4

$R^L$::{Address, isInstanceOf, Relation}
$R^L$::{Address, hasAttribute, Address_ID}
$R^L$::{Address, hasAttribute, Street}
$R^L$::{Address, hasAttribute, Name}
$R^L$::{Address, hasAttribute, Zip}
$R^L$::{Name, isInstanceOf, Attribute }
$R^L$::{Street, isInstanceOf, Attribute }
$R^L$::{Zip, isInstanceOf, Attribute }
$R^L$::{Address_ID, isInstanceOf, PrimaryKey }

Figure 3:
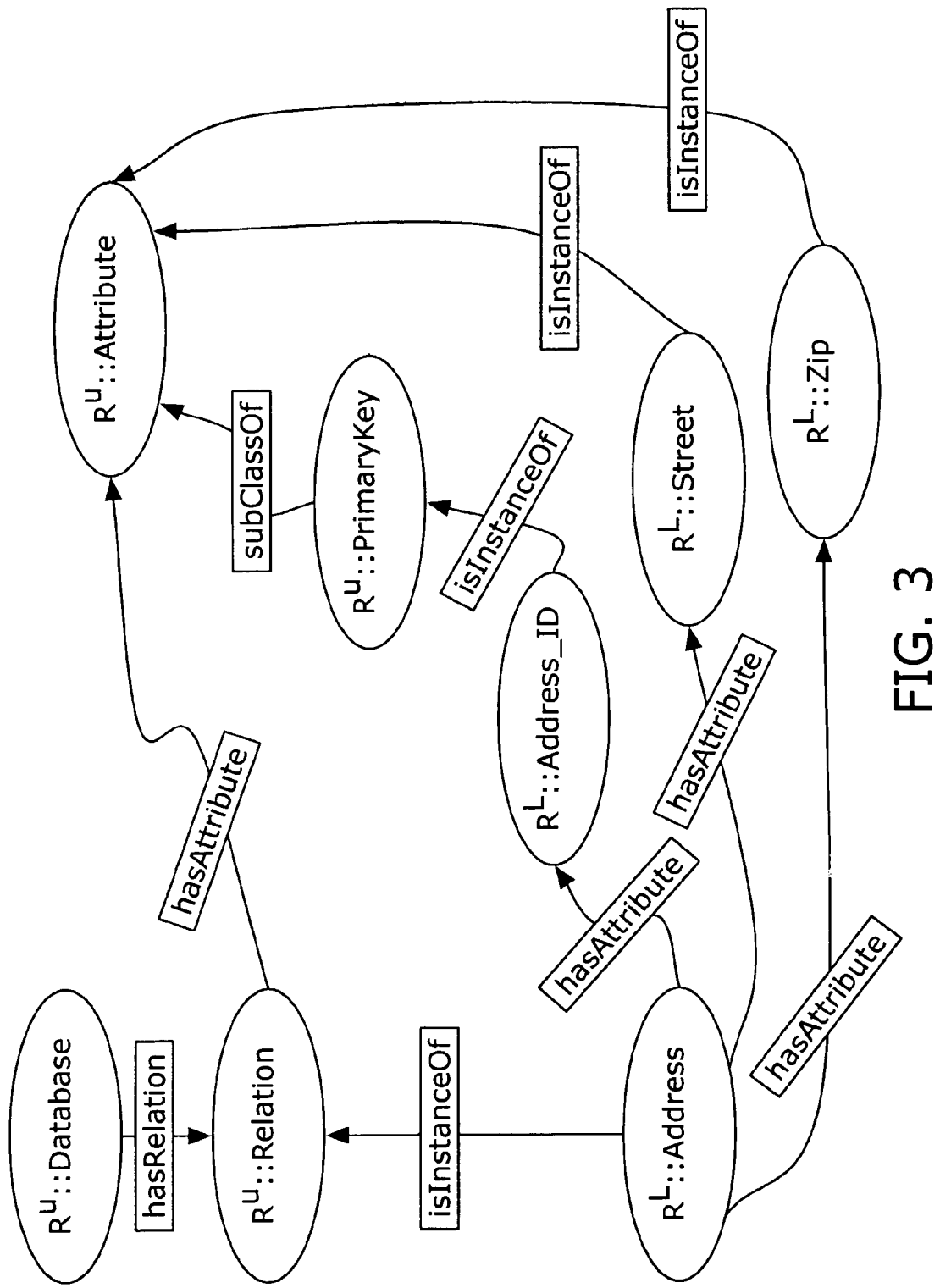
FIG. 3 is a partial ontology for an address database.

R is then the conjunction of $R^U$ and $R^L$ as partially shown in FIG. 3 (Note that the fields "City" and "State" have not been shown in R for the sake of brevity, but are linked to the concepts "CityOrTown" and "State" in D in a manner analogous to that shown for "Street" and "Zip" below). If there are entity relationships not captured in the R, these may be inserted manually at this stage.

The concepts in database ontology R are then mapped to the concepts in the domain ontology D to create an augmented domain ontology $D^+$. In this example, this is done using the relationship hasSource, as shown in Table 5. (Note that the linked concepts need not have identical names, as in the mapping between D::PostalZIP and R::Zip).

TABLE 5

$D^+$::{D::Name, hasSource, R::Name}
$D^+$::{D::Street, hasSource, R::Street}
$D^+$::{D::PostalZIP, hasSource, R::Zip}

Figure 4:
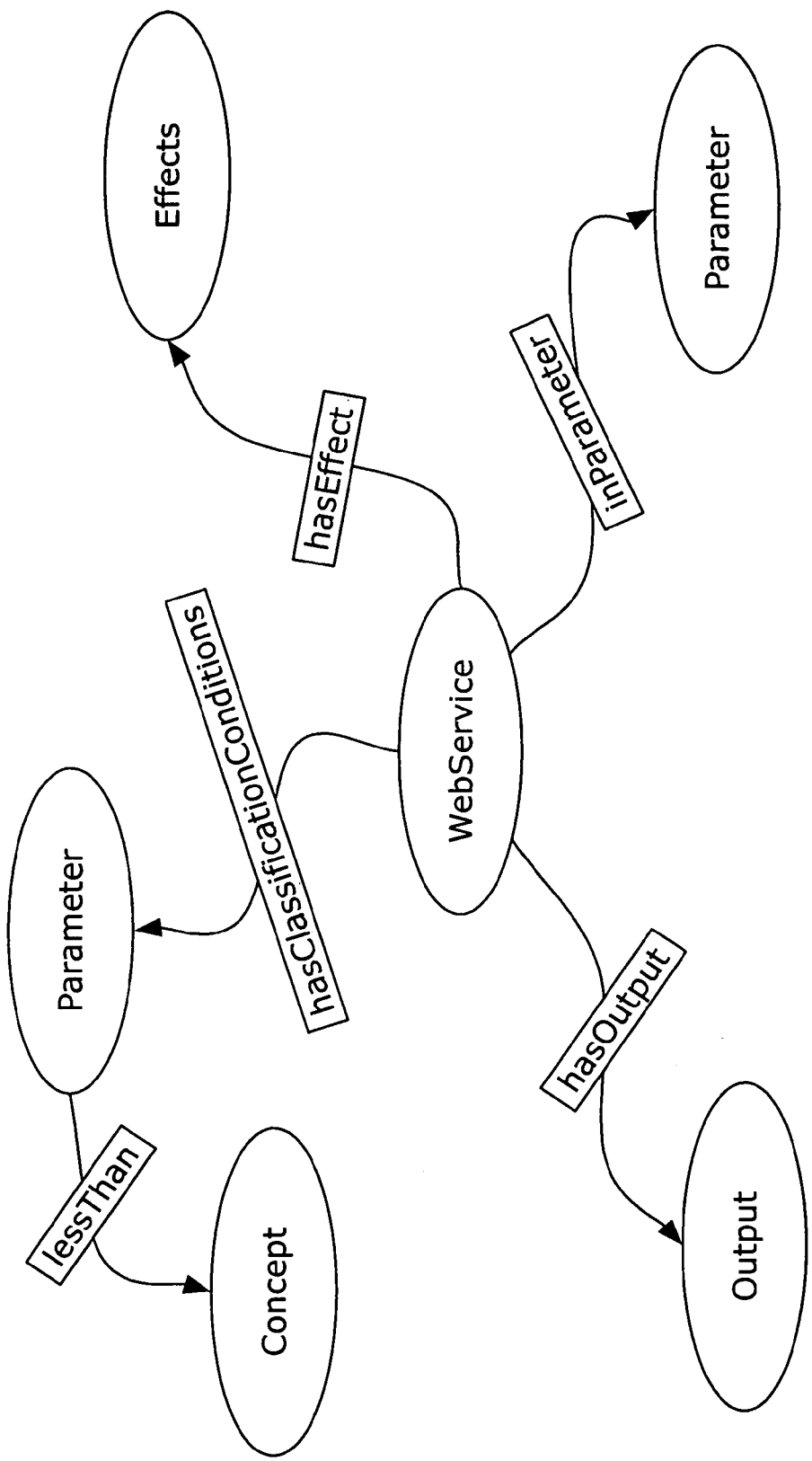
FIG. 4 is a generic upper ontology for a web service.
Figure 5:
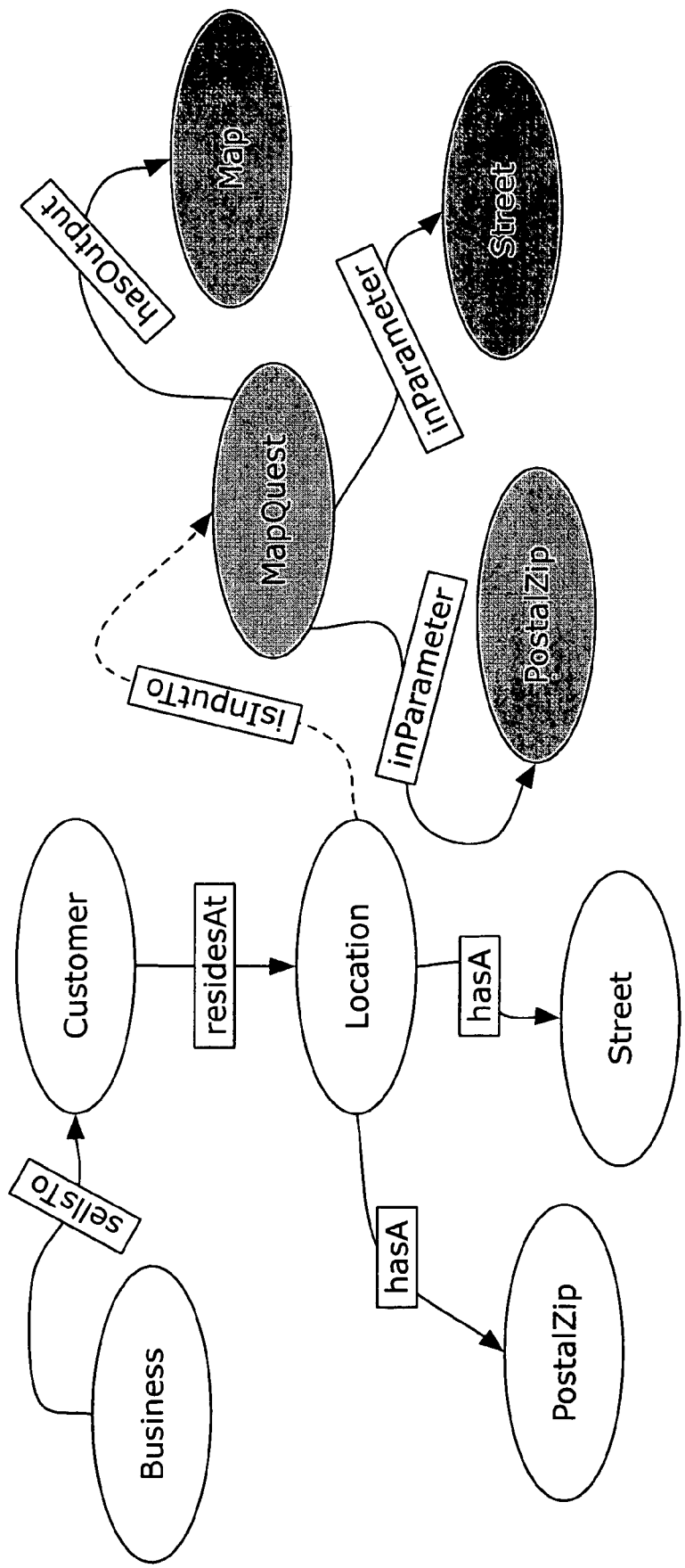
FIG. 5 is a portion of an augmented domain ontology $D^+$.

The map-finding web service is then mapped to an upper ontology $W^U$ that models web services as concepts of Inputs (inParameters), Output, Classification Conditions, and Effects, as shown in FIG. 4. An instance of this ontology, $W^I$, is created for the map-generation web service of the example. This ontology is then mapped to $D^+$ to form augmented ontology $D^{++}$, for example using the relationship isInputTo, e.g. $D^{++}$::{$D^+$::Location, isInputTo, $W^I$::MapQuest}. A portion of $D^{++}$, showing a link between $W^I$ and $D^+$, is shown in FIG. 5.

Figure 6:
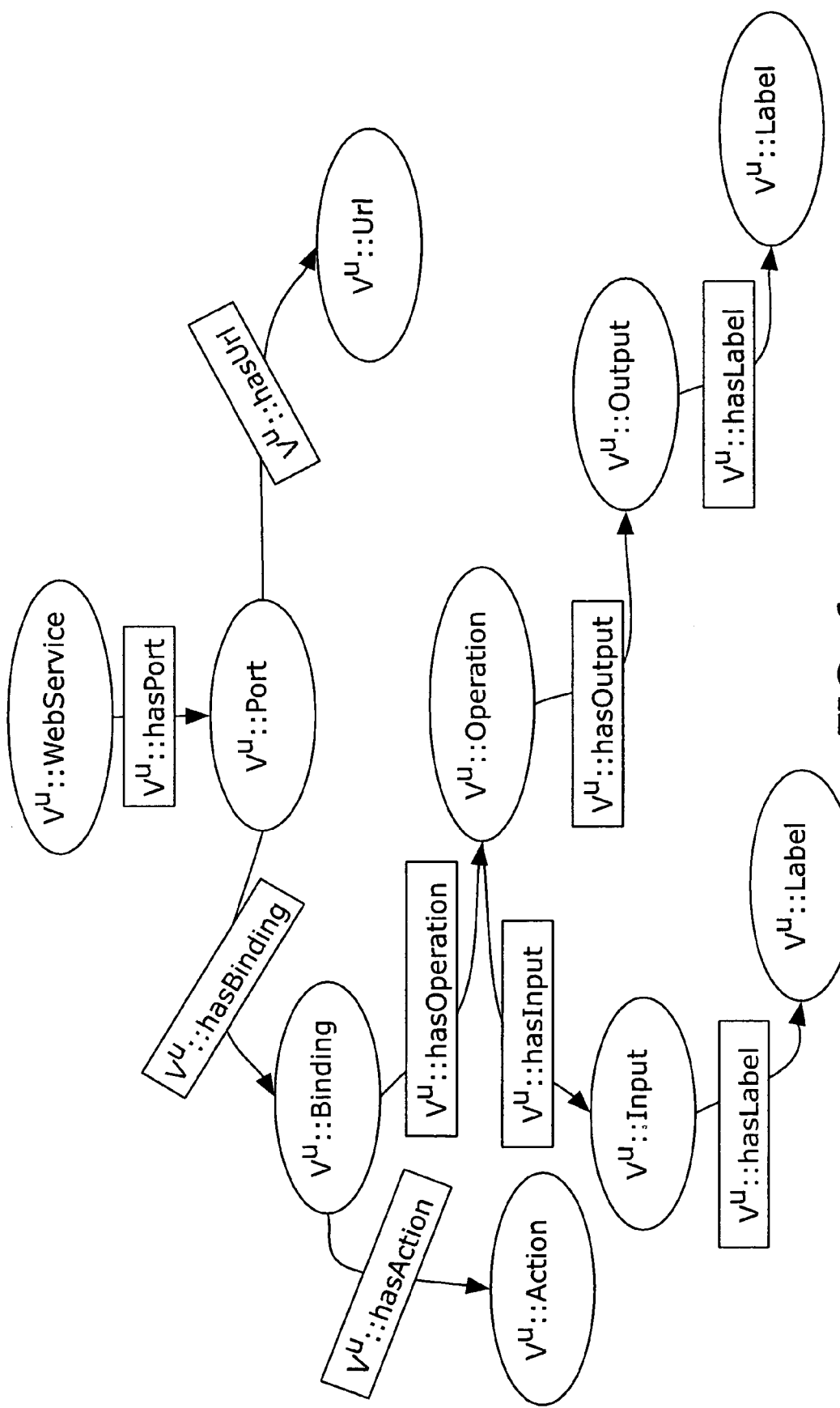
FIG. 6 is a generic upper ontology for accessing a web service.
Figure 7:
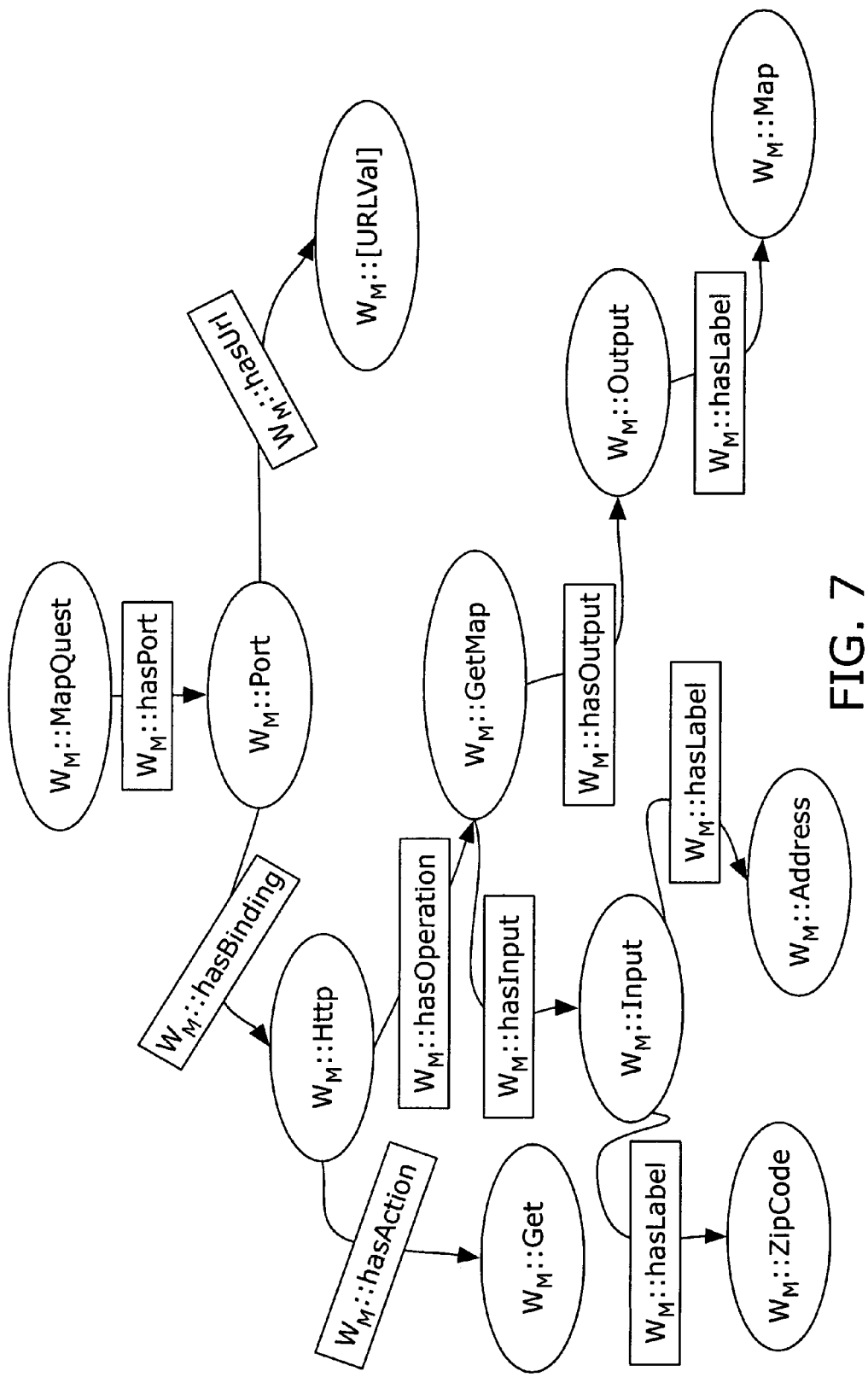
FIG. 7 is an instance of the ontology of FIG. 6 for a specific web service.
Figure 8:
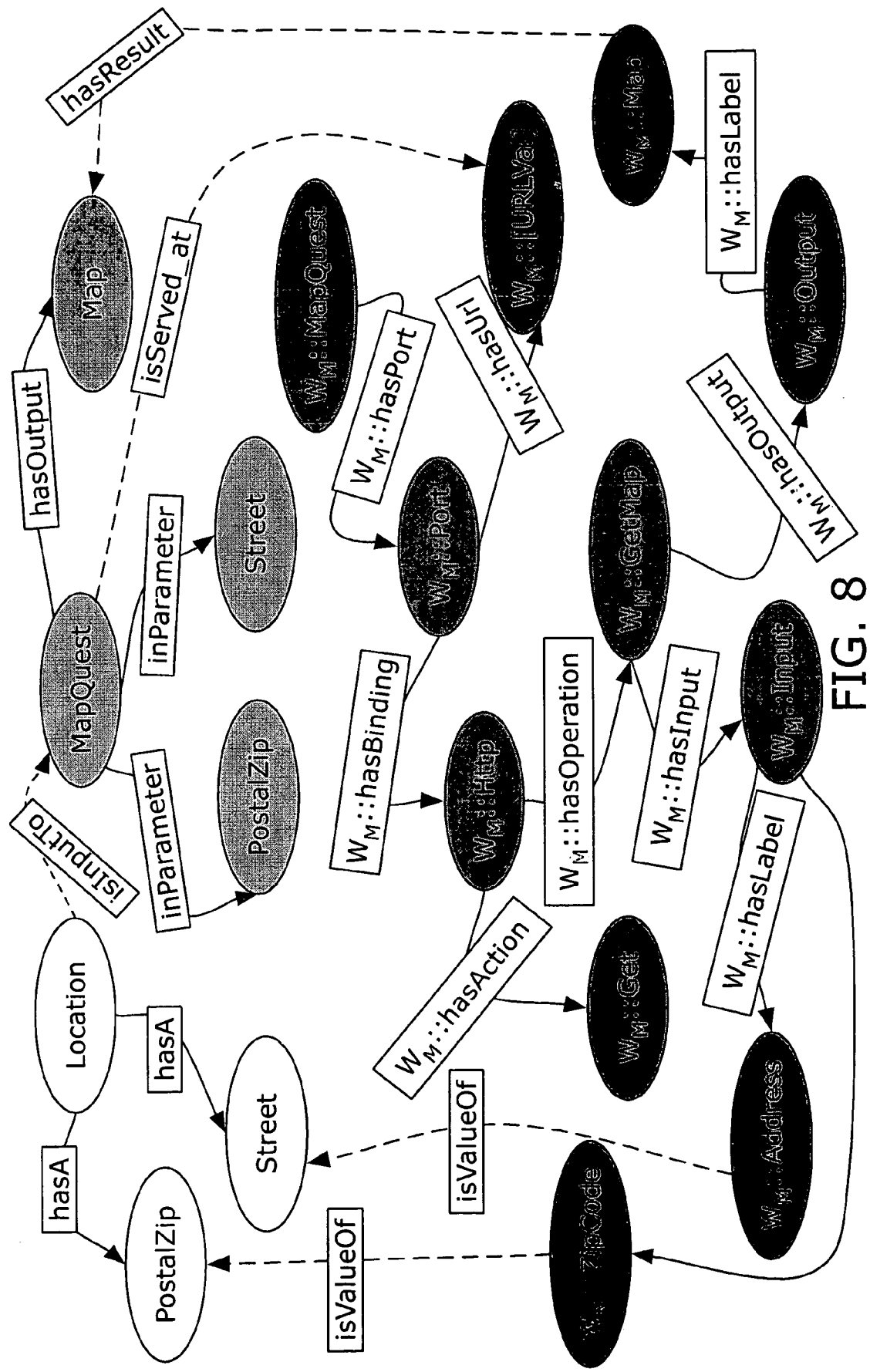
FIG. 8 is a portion of an augmented domain ontology D++.

For automatic code generation, in addition to the ontological representation of the inputs and outputs of the web service, access parameters for the web service may be needed. A generic upper ontology, $V^U$, that models how to access and invoke a web service is shown in FIG. 6. $V^U$ also preserves the structure of any document consumed or produced by the web service. An instance of this ontology, $W_M$, is created to describe the parameters for invoking the web service. As shown in FIG. 7, $W_M$ shows parameters for invoking MapQuest™. (For clarity in the drawing, the URL for MapQuest™, http://mapquest.com/maps/map.adp, is represented as [URL Val]). $W_M$ is then mapped into $D^{++}$, for example using the relationships isValueOf, isServedAt, and hasResult. The isValueOf links the range or object value of the hasLabel relationship in the ontology $W_M$ to concepts in the augmented domain ontology $D^{++}$. The isServedAt relationship links the subject or domain of the hasOutput relationships in the $D^{++}$ ontology to the object of the hasUrl relationship in the $W_M$. The hasResult relationship links the range of hasLabel relationship in the $W_M$ to the range of hasOutput relationship in the ontology $D^{++}$. This relationship is useful when the output of the web service contains the inputs of another, as further discussed below. A portion of $D^{++}$ including $W_M$ and $W^I$ is shown in FIG. 8, illustrating the links between the web service ontologies and the domain ontology.

Once the ontology $D^{++}$ has been created, a single application (hereinafter, the "Semantic Viewer") can broker a variety of user requests to return data outputs and/or executable glue code. As implemented in this example, the Semantic Viewer is a web-enabled application. When a user enters any input data, it is linked to concepts in the augmented domain ontology using the userinput, userOutput, and userCriteria relationships. The userOutput links a goal the user is interested in a concept in the augmented domain ontology. The userinput links the user's input to the object value of the inParameter relationship that are not input to web services in the augmented domain ontology. The userCriteria is used to link user's input to concepts in the augmented domain ontology.

Figure 9:
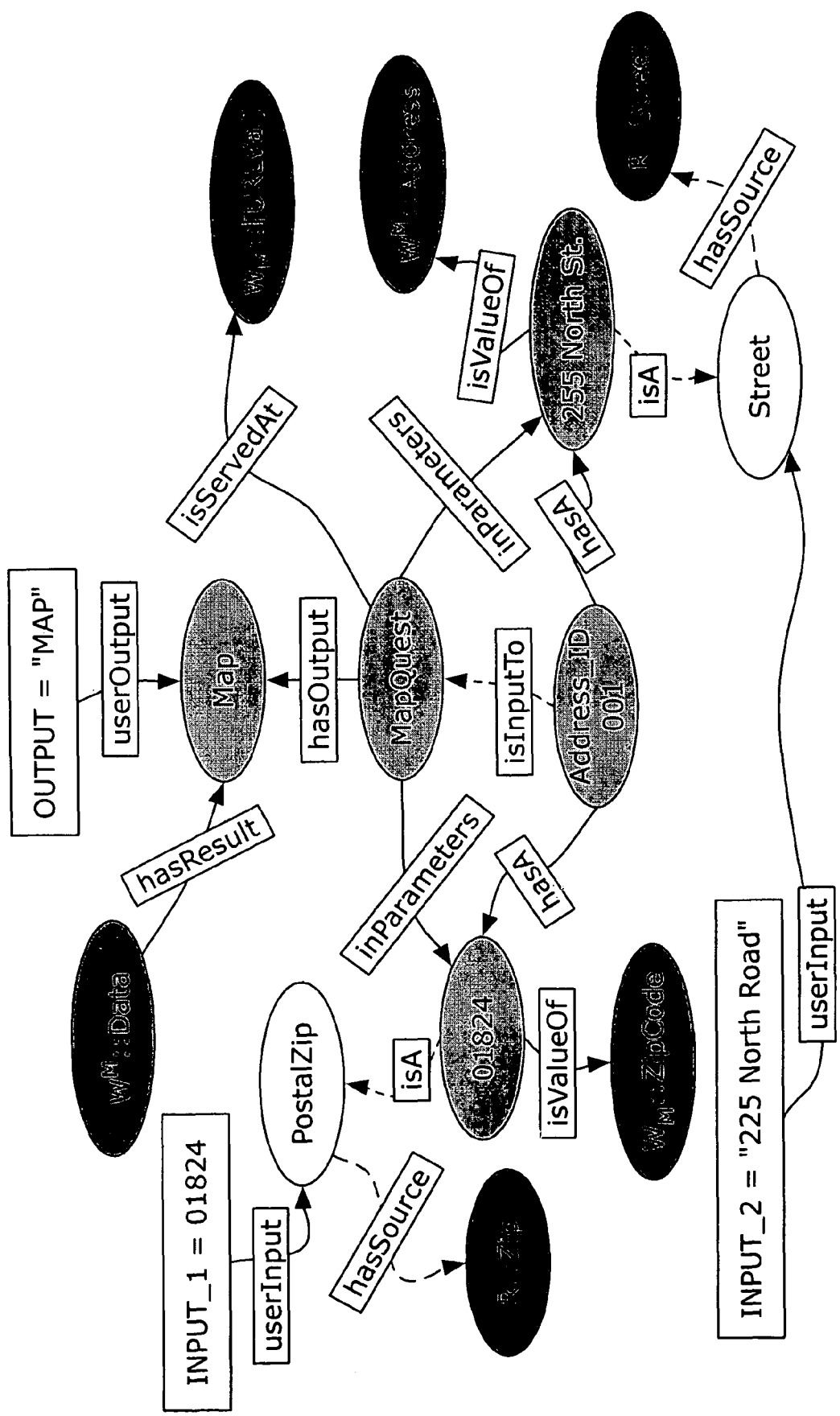
FIGS. 9, 10, 11a, and 11b show execution paths within $D^{++}$.

For example, suppose a user provides "255 North Road" and "01824" as inputs, and "map" as a requested output. The Semantic Viewer searches $D^{++}$ for matches to the input values, and locates them in $R^L$ as a Street and a Zipcode, respectively. In addition, it searches for "map" and locates it as a concept in $W^I$. It then locates a path through the ontology graph linking the inputs with the output, as shown in FIG. 9. Finally, it generates executable glue code to actually invoke the web service discovered (in this case, MapQuest™) and return a map of the requested address.

The above example user inputs are the same as what would be required if the user were simply to visit MapQuest™ and request the map directly, although the user does not have to know how to access MapQuest™ in order to use the Semantic Viewer as described in this example. If multiple map services were available, the Semantic Viewer would present the user with multiple execution paths, allowing access to whichever map service was desired, again without requiring the user to know the URL or data formatting requirements of each service.

Figure 10:
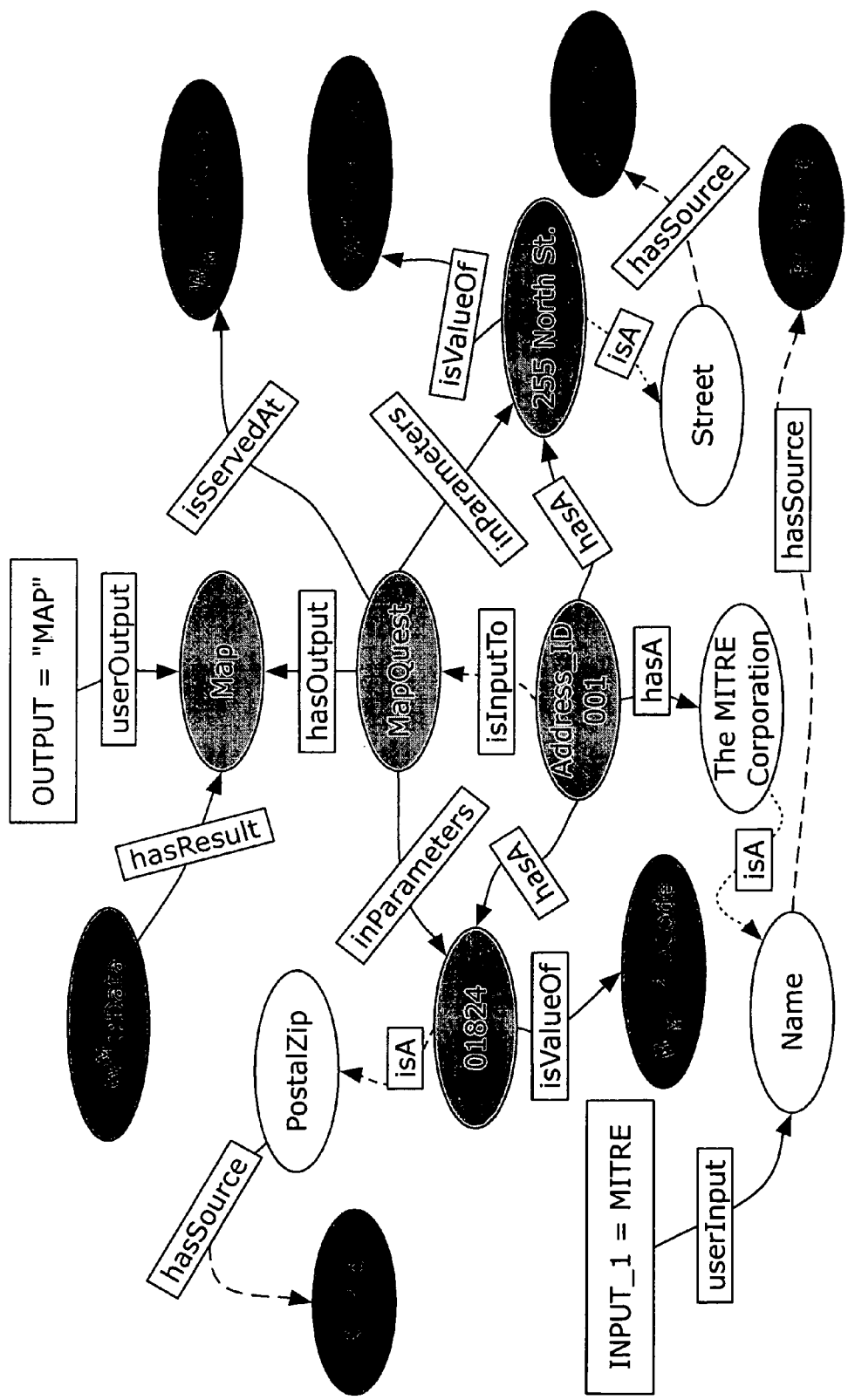

The additional power of the Semantic Viewer can be seen if the user instead enters "MITRE" as an input, and "map" as a requested output. No available web service in $D^{++}$ takes a corporate name and returns a map. However, the Semantic Viewer still locates "MITRE" in the database as an instance of Business_Name, and discovers a path through the ontology graph linking it to the Map output of MapQuest™, as shown in FIG. 10. Thus, the execution path returned now includes a database query to discover the street address of the MITRE Corporation, formats that data for the MapQuest™ map service, and returns a map of the company location.

Figure 11:
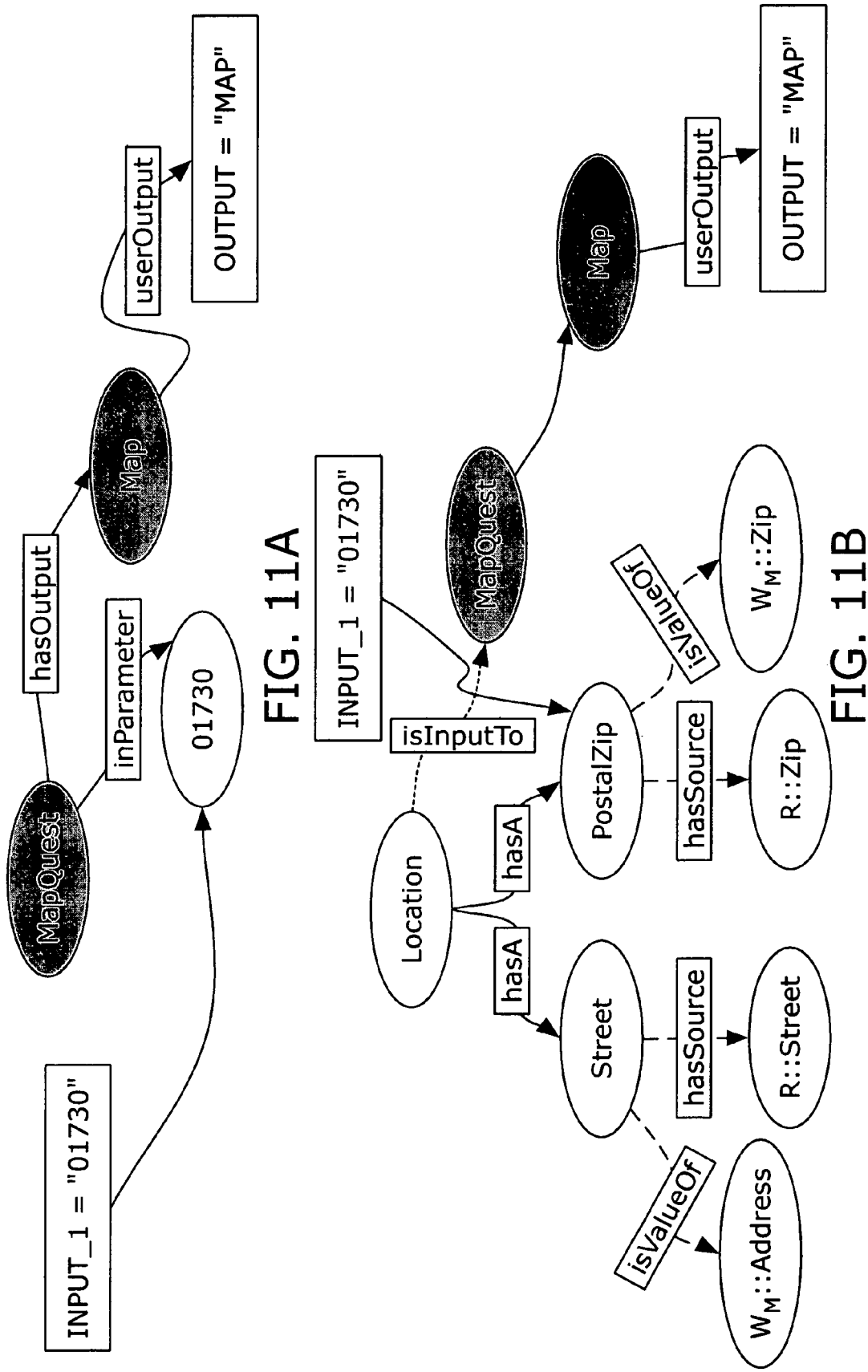

In practice, the Semantic Viewer may find multiple execution paths for a single query. In this case, the user may be presented with the multiple execution paths and allowed to select the desired path. For example, in the case where a user enters a single input of "01730" and a desired output of "map," there are two possible connecting paths through the $D^{++}$ described above. According to one path, illustrated in FIG. 11a, the Semantic Viewer recognizes "01730" as a zip code, and passes it to MapQuest™ without a street address, resulting in a map of the general area around that zip code (the recognition of "01730" as a zip code according to this path may be through its existence in the database, but it is also within the scope of the invention to manually indicate that 01730 is a zip code in order for the Semantic Viewer to discover an execution path). However, there also exists a path, illustrated in FIG. 11b, in which the Semantic Viewer finds each instance of "01730" in the database, and passes each Street Address/Zipcode combination (for each listed business having that zip code) to MapQuest™, obtaining maps for every business in the selected zip code area.

In the above examples, a single output of a single web service has been the desired output. However, multiple outputs may also be requested, and these outputs may not all be derived from the same web service. For example, suppose a user enters a single input of "01730" and desired outputs of "map" and "business name." In this case, an execution path similar to the second path described in the previous paragraph exists. The Semantic Viewer recognizes 01730 as a zip code, and queries the database to find all of the businesses in that zip code, requesting both the business name and the street address. The street addresses and the selected zip code are passed to MapQuest™, and the resulting maps are returned along with the business names, for each business in the database that matches the criteria.

The Semantic Viewer may also "chain" web services as necessary to obtain a desired result. For example, suppose the domain ontology also contains the relationships hasVoiceNumber and hasFaxNumber, and has been further augmented to include a reverse lookup telephone service (such as that found at http://www.switchboard.com), which accepts an input "telephone number" and provides a listing name and address. In this case, when a user enters "781-271-2000" as input and "map" as output, one of the returned execution paths will include taking the telephone number from the database listing, passing it to the reverse lookup service to obtain a street address, and passing the street address to MapQuest™ to obtain the requested map.

Similarly, web services may operate in parallel on the same or related inputs to provide multiple outputs. For example, web services that provide maps (as discussed above) and aerial photos (such as that found at http://www.terraserver-usa.com/) may both be called with the same address information, if an address is input and both "map" and "photo" are selected as outputs.

Figure 12:
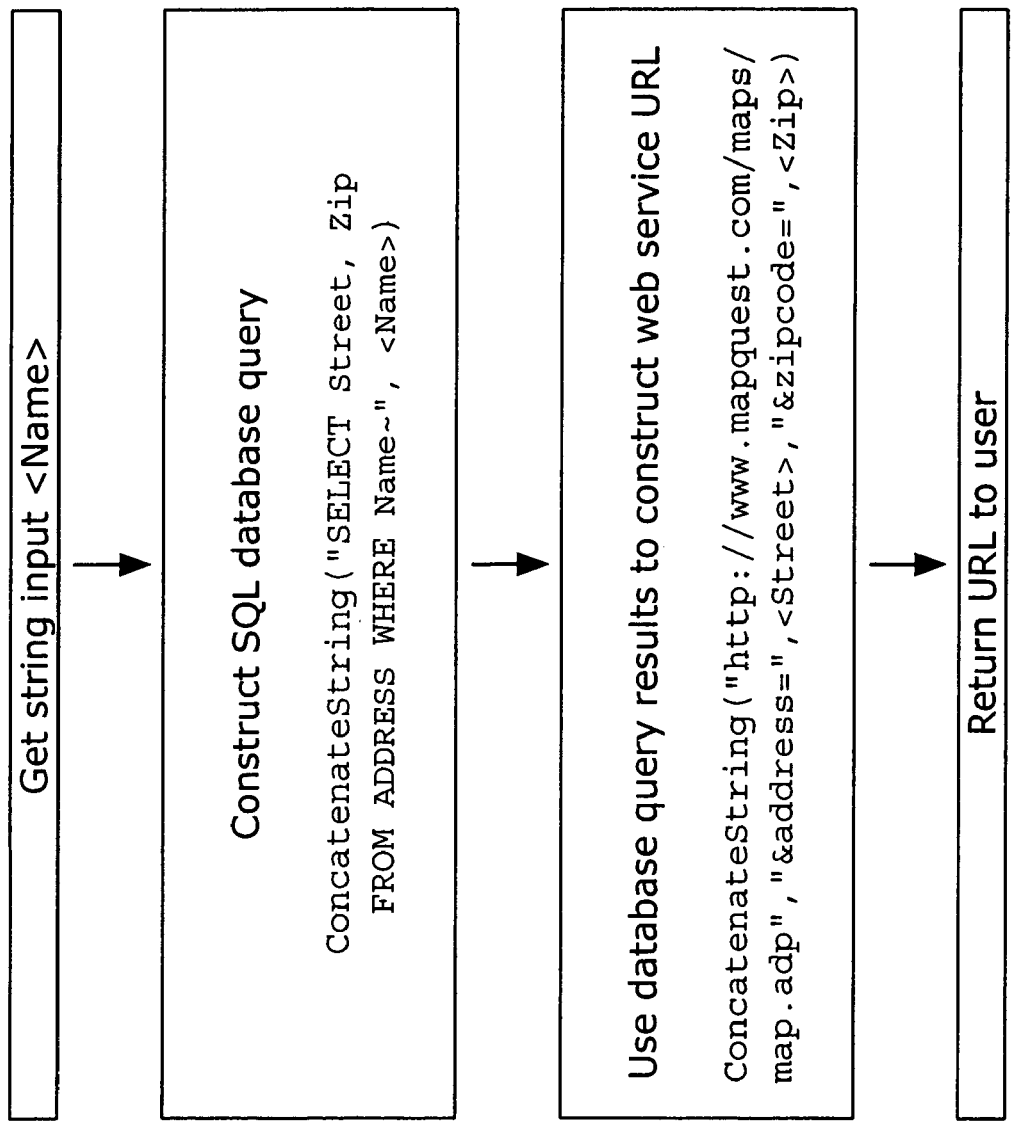
FIG. 12 is a flow chart for a standalone web service whose glue code may be generated by the Semantic Viewer.

For each of the above-described examples, the Semantic Viewer has located an execution path, and then performed the necessary steps to answer a user query. However, the execution path may also be used to generate glue code necessary to create a new service of the type requested. For example, in the case described above in which a user provided the input "MITRE" and the output "map," in addition to simply providing a map of the MITRE location, the Semantic Viewer can also return executable "glue code" for a service that accepts a company name, looks it up in the database to find a street address, passes the street address to MapQuest™, and returns the requested map. This static code can then be directly used to create a new standalone web service which is independent of the Semantic Viewer. A flow chart of the resulting web service, including exemplary pseudocode describing the construction of a SQL database query and a web service URL, is shown in FIG. 12. Of course, the code generated will depend on the specific requirements of the database and web service. Further the database type and query syntax may be represented in ontological form and linked to the R in an analogous way to the construction of $W_M$ for accessing the web service, as discussed above.

EXAMPLE 2

Figure 13:
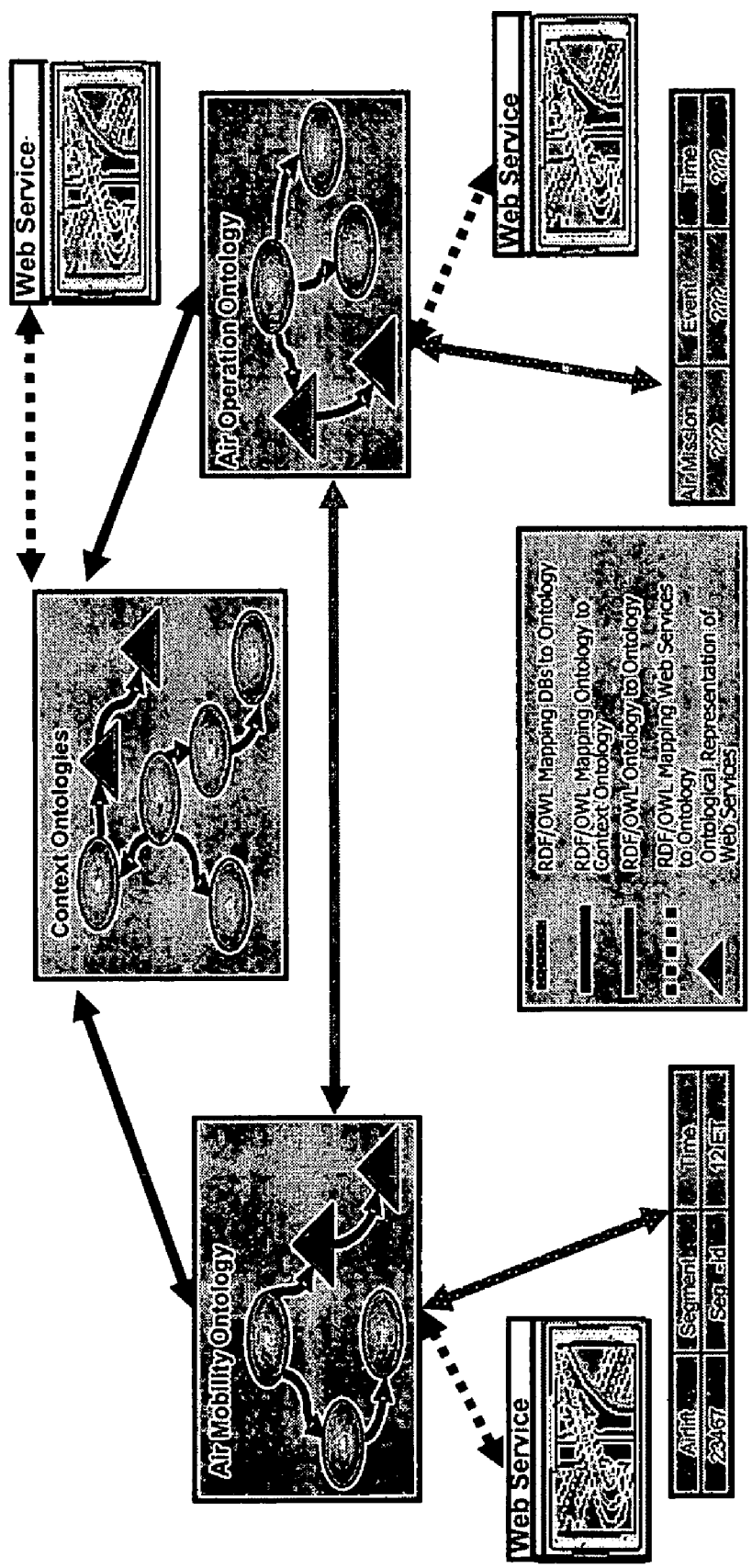
FIG. 13 is schematic diagram outlining a method to integrate multiple, disparate information systems across an enterprise.

Integrating Disparate Information System Ontologies Into a Searchable Ontological Structure The following example illustrates how two disparate information systems within a given enterprise may be integrated into a service-oriented architecture according to the present invention. The approach builds upon the semantic framework outlined in Example 1 for the integration of databases and web services within a given information system, and the following example extends this framework to facilitate the integration of multiple information systems within an enterprise. An overview of the approach is shown in FIG. 13, and it encompasses the following steps:

Providing a domain ontology for each information system

Providing a context ontology to capture commonly-held concepts and their representations on each information system Creating and linking a translator web service ontology to the domain ontology Mapping the individual information system ontologies to the context ontology Mapping the concepts across individual information system ontologies Brokering a request to suggest workflows between a data instance on a source information system and a corresponding concept on a target information system Automatically executing one, or more, of these generated workflows to create the corresponding data instance on a target information system.

Figure 14:
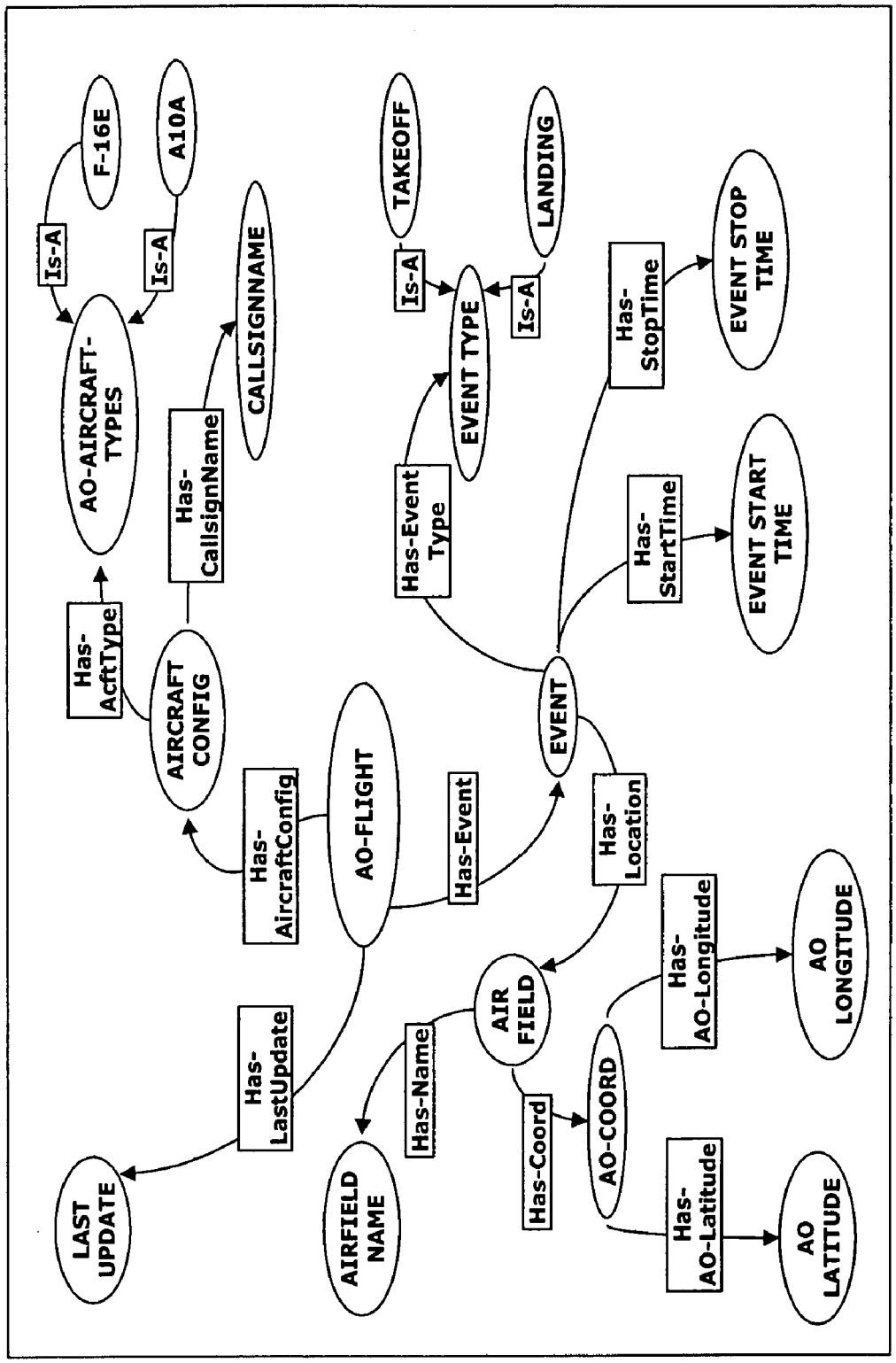
FIG. 14 is a portion of an Air Mobility (AM) system ontology.
Figure 15:
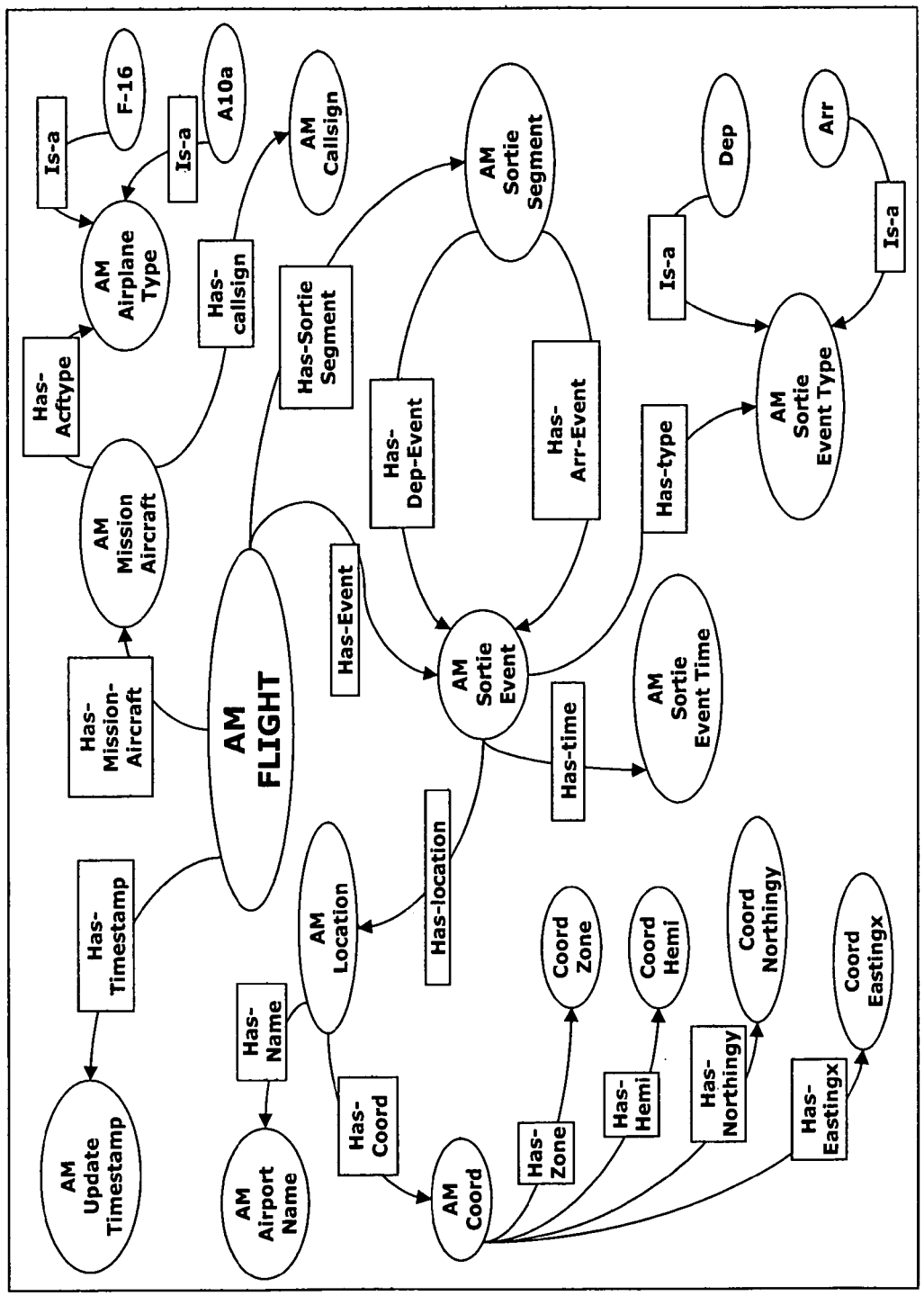
FIG. 15 is a portion of an Air Operations (AO) system ontology.

The example below discusses the integration of two distinct air-flight scheduling systems, Air Mobility (AM) and Air Operations (AO), within the Department of Defense (DoD) enterprise. Each flight scheduling system represents an information system, and the concepts that characterize each information system are included within its respective domain ontology. The AO and AM domain ontologies are built using OWL/RDF relations and are represented as a uniform structure of triples in a fashion similar to that outlined in Example 1. FIG. 14 and FIG. 15 graphically represent selected portions of the AM and AO domain ontologies, respectively.

Although both the AM and AO ontologies describe aircraft and related events, FIG. 14 and FIG. 15 indicate that significant distinctions exist in the structure, representation and terminology of these concepts across the AM and AO systems. For example, the AM ontology represents position using the Universal Transverse Mercator (UTM) coordinates, while the AO ontology represents position with Geodetic coordinates. A similar discrepancy is noted between the terminology used by the AM and AO ontologies to denote equivalent Aircraft Types. Further, the AM and AO ontologies use different overall structures to represent particular flight concepts. For example, the AO ontology provides both starting and stopping times for events, while the AM ontology uses only a single event time.

To provide interoperability between information systems in the enterprise, or in this example between the AM and AO systems, a number of "context ontologies" must be created to account for the representational, structural, and terminological mismatches between these respective systems. These "context ontologies" capture concepts commonly held across the enterprise and account for the representation of a particular concept on each information system. The following example addresses three such context ontologies: Position, Time, and Types of Things, i.e., Where, When and What.

The Position context ontology contains comprehensive specifications of the different representations of a Geo-Coordinate point within the AM and AO domain ontologies (e.g., the genus of Coordinate Systems, Datums, Coordinate Reference Frames and formats). In the following example, the Position context ontology is based on the set of coordinate systems used by National Geospatial Agency (National Imagery and Mapping Agency (NIMA) USA, GEOTRANS 2.2.4-Geographic Translator.

Figure 16:
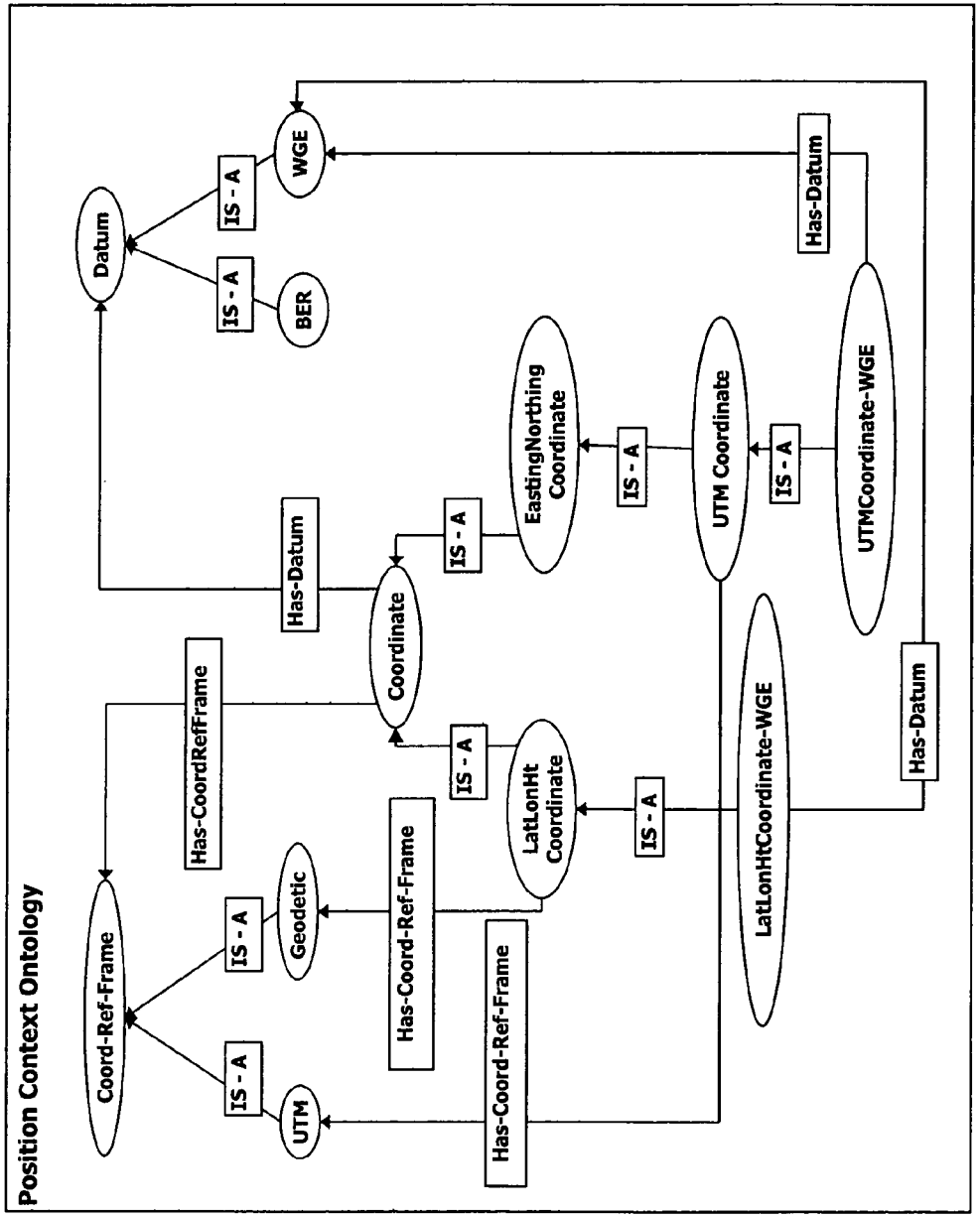
FIG. 16 is a portion of a Position context ontology.

A small portion of the overall Position context ontology is presented in FIG. 16. Using this ontology, any Geo-Coordinate position may be disambiguated by specifying its Coordinate System, its Coordinate Reference Frame, and its Datum using OWL classes and object properties. These particular classes, and the relationships between them, are defined in the context ontology, and a partial listing of these definitions is given below (for a more complete listing of classes and relationships, see Sabbouh, et al., "Using Semantic Web Technologies to Enable Interoperability of Disparate Information Systems," as described at http://www.mitre.org/work/tech_papers/tech_papers_05/05_1025/05_1025.pdf, incorporated herein by reference in its entirety):

```
<owl:Class rdf:id="COORDINATE"/>
<owl:Class rdf:id="DATUM"/>
<owl:Class rdf:id="COORD-REF-FRAME"/>
<owl:ObjectProperty rdf:ID=" Has-Datum">
    <rdfs:domain rdf:resource="#COORDINATE "/>
    <rdfs:range rdf:resource="#DATUM "/>
</owl:ObjectProperty>
<owl:ObjectProperty rdf:ID=" Has-Coord-Ref-Frame">
    <rdfs:domain rdf:resource="#COORDINATE "/>
    <rdfs:range rdf:resource="#COORD-REF-FRAME"/>
</owl:ObjectProperty>
```

Context ontologies are specified in a similar fashion for the ubiquitous Time and Types of Things concepts. A number of Time ontologies are publicly available (e.g., Hobbs, J., "A DAML ontology of time", 2002), and these ontologies are generally based on the numerous representations of date and time used by the military (e.g., mm/dd/yyyy, Zulu, EST, etc.). The OWL classes and relationships used within the Time context ontology thus closely mimic those used in the Position context ontology.

Two different variants of the Types of Things context ontology have been discerned for the AM and AO systems: Aircraft-Types, and Event-Types. These context ontologies contain the different representations of aircrafts and events that are used by both systems, and as a result, two subtypes for Aircraft-Types and Event-Types have been developed. Table 6 provides a partial listing of these subtypes.

TABLE 6

AM-AIRCRAFT-TYPES subClassOf AIRCRAFT-TYPES
AO-AIRCRAFT-TYPES subClassOf AIRCRAFT-TYPES
F-16 instanceOf (OWL Individual) AM-AIRCRAFT-TYPES
F-16E instanceOf (OWL Individual) AO-AIRCRAFT-TYPES
AM-EVENT-TYPES subClassOf EVENT-TYPES
AO-EVENT-TYPES subClassOf EVENT-TYPES
DEP instanceOf (OWL Individual) AM-EVENT-TYPES
TAKEOFF instanceOf (OWL Individual) AO-EVENT-TYPES A "translator web service" must be associated with each context ontology to translate between the distinct data representations on each information system ontology. The following example utilizes the GeoTrans web service, a translator web service based on the Geographic Translator (see National Imagery and Mapping Agency (NIMA) USA, GEOTRANS 2.2.4-Geographic Translator). Although concentrating on a particular web service and the Position context ontology, the approach outlined in the example is easily extended to include other appropriate web services and additional context ontologies.

Figure 17:
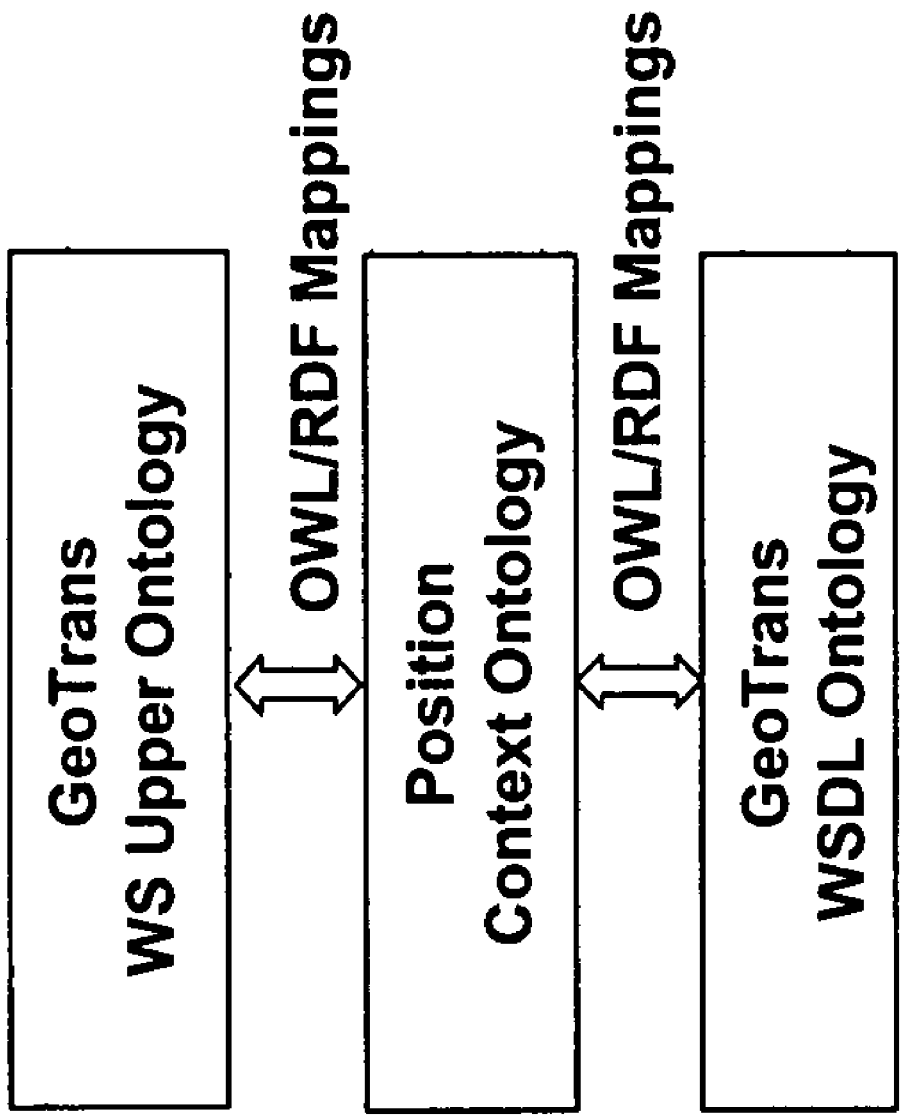
FIG. 17 is a flow chart of a method to integrate web service and context ontologies.

The integration of the GeoTrans web service into the Position context ontology is outlined in FIG. 17, and the approach follows the process outlined in Example 1 for the integration of a generic web service into a domain ontology. Prior to integration, the GeoTrans WSDL ontology must be re-created from the GeoTrans WSDL file stored in the ontology management system. The GeoTrans web service must also be mapped to an upper ontology to create a GeoTrans web service upper ontology. The GeoTrans upper ontology and the GeoTrans WSDL ontology are then linked to the Position context ontology using OWL/RDF mappings to form an augmented ontology.

Figure 18:
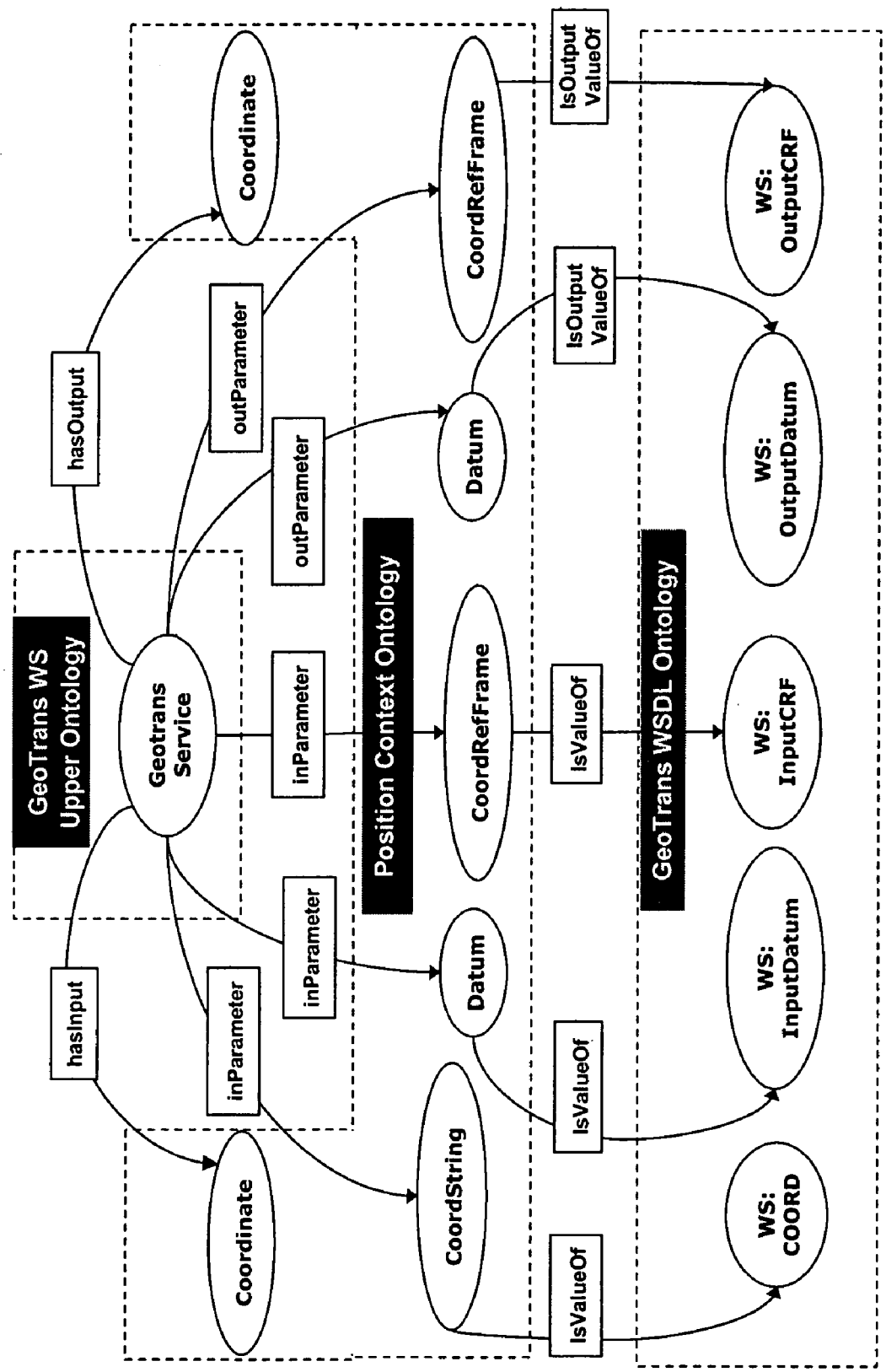
FIG. 18 is a portion of a GeoTrans web service descriptor language (WSDL) ontology.

FIG. 18 graphically presents a portion of the GeoTrans upper ontology, the WSDL ontology, and the mappings that connect each to the Position context ontology. The OWL/RDF mappings in FIG. 18, as well as their domains and ranges, are summarized in Table 7. While the example employs these mappings to connect a web service to a context ontology, these same mappings could be employed to connect a generic web service to an IS domain ontology.

Figure 19:
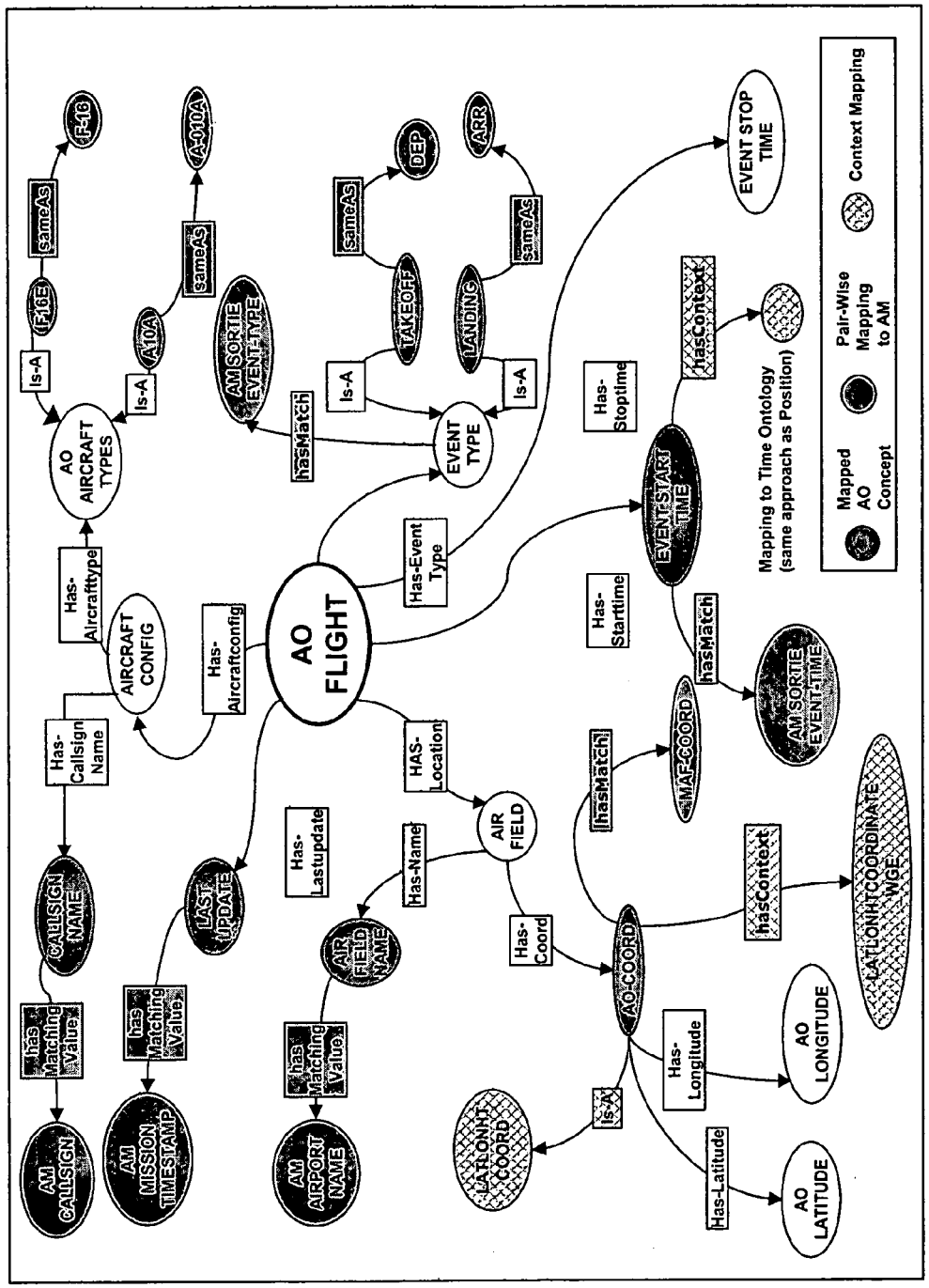
FIG. 19 is a portion of an AO system ontology mapped onto a portion of the AM system ontology and the Position context ontology.

The relevant concepts in the AM ontology must then be mapped to the corresponding concepts in the AO ontology to enable the exchange of data instances between the AM and AO information systems. This required mapping occurs in two steps. The individual concepts in the AM ontology are first matched with corresponding concepts in the AO ontology to generate semantic matches between concepts. Concepts within the AM and AO ontologies are then independently mapped to the context ontology to resolve representational mismatches. Note that concept matching requires agreement between the AO and AM users, whereas mapping to context ontologies is done independently for each system. Table 8 lists a number of the OWL/RDF mappings that link concepts in the AM and AO domain ontologies to the context ontology, and FIG. 19 presents a portion of the AO ontology fully mapped to the AM and Position context ontologies.

TABLE 7

| Domain | OWL/RDF Mappings | Range |
| --- | --- | --- |
| rdfs: Class (in Context Ontology) | isInputOf | Webservice: Class (in WS upper ontology) |
| Webservice: Class (in WS upper ontology) | hasInput (inverseOf isInputOf) | rdfs: Class (in Context Ontology) |
| rdfs: Class (in Context Ontology) | isOutputOf | Webservice: Class (in WS upper ontology) |
| Webservice: Class (in WS upper ontology) | hasOutput | rdfs: Class (in Context Ontology) |
| Webservice: Class (in WS upper ontology) | inParameter | rdfs: Class (in Context Ontology) |
| Webservice: Class (in WS upper ontology) | outParameter | rdfs: Class (in Context Ontology) |
| Webservice: Class (in WS upper ontology) | hasEffect | rdfs: Class (in Context Ontology) |
| Webservice: Class (in WS upper ontology) | hasClassification Condition | rdfs: Class (in Context Ontology) |
| rdfs: Class (in Context Ontology) | isValueOf | rdfs: Class (in WS WSDL Ontology) |
| rdfs: Class (in Context Ontology) | isOutputValueOf | rdfs: Class (in WS WSDL Ontology) |
| rdfs: Class (in Context Ontology) | hasResult | rdfs: Class (in WS WSDL Ontology) |
| rdfs: Class (in Ontology) | isCorrelatedWith | rdfs: Class (in Ontology) |

TABLE 8

| Domain | OWL Object Property | Range | When to Use |
| --- | --- | --- | --- |
| rdfs: Class (in IS Ontology) | hasContext | rdfs: Class (in Context Ontology) | Representational change |
| rdfs: Class (in Context Ontology) | isTheContextOf (inverse of hasContext) | rdfs: Class (in IS Ontology) | Representational change |
| rdfs: Class (in IS Ontology) | hasMatch (symmetric) | rdfs: Class (in IS Ontology) | Representational change |
| rdfs: Class (in IS Ontology) | hasMatchingValue (symmetric) | rdfs: Class (in IS Ontology) | No representational change |

The OWL/RDF mappings in Table 8 are asserted to match equivalent concepts in the AM and AO domain ontologies and to resolve the resulting mismatches. The following mapping could be asserted when instance values can be copied from the AM system directly to the AO system without transformation:

AIR-FIELD-NAME hasMatchingValue AM-AIRPORT-NAME.

Representational mismatch between coordinates in the AO and AM domain ontologies could be resolved through the assertion of the following sequence of mappings:

AO-COORD hasContext LATLONHTCOORDINATE_WGE

AM-COORD hasContext UTMCOORDINATE_WGE

AO-COORD hasMatch AM-COORD

To reconcile terminology mismatches between various event types or various aircraft types in the AM and AO systems, the following mappings could be asserted:

AM-AIRCRAFT-TYPES hasMatch AO-AIRCRAFT-TYPES

AM-EVENT-TYPES hasMatch AO-EVENT-TYPES

F-16E OWL:sameAs F-16

DEP OWL:sameAs TAKEOFF

ARR OWL:sameAs LANDING

The approach outlined by the present example, although describing only a small number of potential mappings, can be easily extended to include any number of appropriate OWL/RDF mapping relations.

Figure 20:
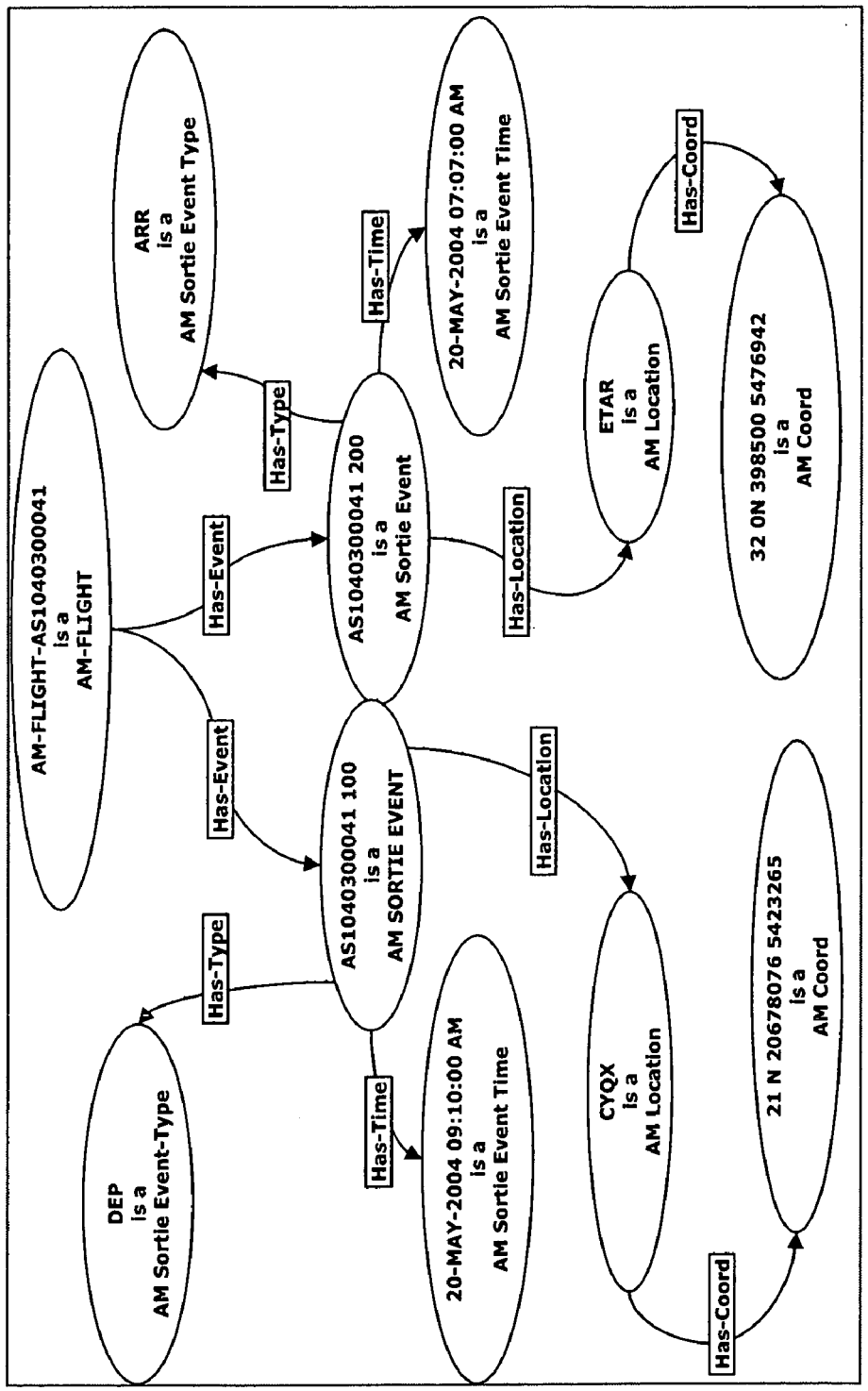
FIG. 20 is a portion of an AM system ontology onto which AM instance data has been mapped.

Having accomplished the mapping of web service ontologies and IS ontologies to context ontologies, the AM database is then mapped onto the AM domain ontology. The mapping process closely follows the approach outlined in Example 1, and once linked, the AM data are treated as instances of the AM ontology. FIG. 20 presents a portion of the resulting augmented AM ontology.

To create AM data on the AO system, the AM data instances must be translated to match the structure, terminology, and representations of concepts on the AO system. To accomplish this end, a mapping interpreter, Onto-Mapper, is built to process the OWL/RDF mappings presented in Table 8 and to create new AO instance data from corresponding data on the AM system. In the semantic framework of the invention, the Onto-Mapper is built as a specialized web service that acts as a Service Agent to be invoked only upon data exchange. Rather than have arbitrary inputs and outputs, this specialized web service interprets the RDF/OWL links to create instance data in a target system from data that originated in a source system. Table 9 outlines the formal definition of the Onto-Mapper.

TABLE 9

Service-Agent subClassOf Web-Service
Onto-Mapper subClassOf Service-Agent
hasAgentInput subProperty hasInput
hasAgentOutput subProperty hasOutput
isAgentInputOf subProperty isInputOf
isAgentOutputOf subProperty isOutputOf
isAgentInputOf InverseOf hasAgentInput
isAgentOutputOf InverseOf hasAgentOutput Then, to translate an AM instance data into an AO instance data, the Semantic Viewer reasons with the mapped ontologies to discover workflows, to invoke/execute/process web services, and to create the corresponding AO instance. The reasoning process employs a combination of graph-traversal algorithms and invocations of the Onto-Mapper. The invention makes extensive use of two graph traversal algorithms: Direct Path Query (DPQ), and Incoming Intersection Query (IIQ).

Given a list of input values and a desired output, the DPQ creates the set of all the direct paths that lead to the desired output concept from the input concepts. The DPQ algorithm may be defined more formally below:

For input list $i_n$, output v
Find the direct paths $P_k$ {$p_1,p_2, \ldots$} ending with v, and starting with each i in $i_n$, where a direct path is the sequence of nodes (i.e., concepts in the ontology graph) and relations or links that connects them. The system can be configured to exclude nodes connected by specific links or to only return paths containing certain links.

Figure 21:
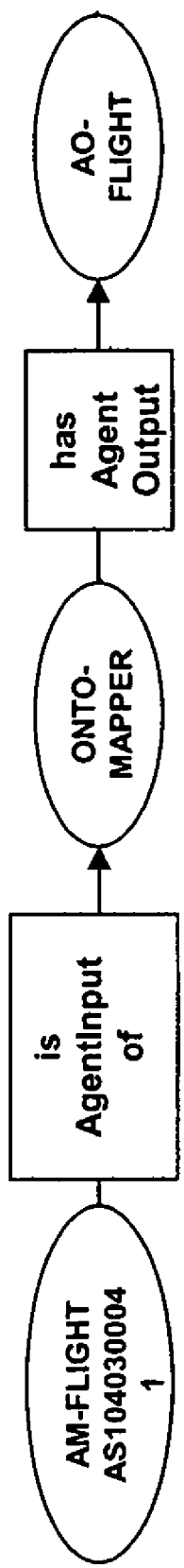
FIG. 21 is an example of an initial workflow obtained after applying the DPQ and IIQ graph traversal algorithms to the mapped ontologies.

The IIQ algorithm creates the set of all the direct paths that lead to the desired output concept using a DPQ. For each input value, the algorithm then creates the set of direct paths that lead to the given input. Third, the algorithm calculates and returns the intersection of these sets. This IIQ algorithm may be defined more formally as follows:

For input list $i_n$, output v
Mapper, Find the list of nodes $x_i$ {$x_1,x_2, \ldots$} that has direct paths $P_k$ {$p_1,p_2, \ldots$} with v
For each i in $i_n$, find the list of nodes $y_j$ {$y_1, y_2, \ldots$} that has direct paths $Q_m$ {$q_1,q_2, \ldots$} with i
Return {$x_i$, $P_k$, $Q_m$} where $x_i=y_j$ The following example illustrates the translation of a particular data instance on the AM system into corresponding data instance on the AO system. A user specifies the AM-FLIGHT instance AM-FLIGHT-AS1040300041, shown in FIG. 20, as an input to the Semantic Viewer and an instance of AOFLIGHT as an output. To discover the initial workflow, the Semantic Viewer first runs a DPQ and, if no workflow is found, an IIQ. The graph traversal algorithms exclude the inParameter, outParameter, hasMatchingValue, hasMatch, hasContext, and isTheContextOf relationships from the initial search. The returned paths are interpreted as a workflow by the Semantic Viewer if they contain the relationship isInputTo or any its sub-properties. An example of an initial execution path returned by these queries is shown in FIG. 21.

The presence of the RDF/OWL link isAgentInputOf indicates that the Semantic Viewer must invoke the Onto-Mapper to create an instance of the AO-Flight (the object of the hasAgentOutput RDF/OWL link and the output of the OntoMapper). To trigger the invocation of Onto-Mapper, the Semantic Viewer asserts that "Onto-Mapper hasAgentInput AM-FLIGHT" and that "Onto-Mapper hasAgentOutput AO-FLIGHT." The Onto-Mapper searches for representational and terminology mismatches by interpreting hasContext, isTheContextOf, and hasMatch links. The result is a set of workflows (i.e., paths containing isInputOf or its sub-properties) that consist of a sequence of web services that must be processed to reconcile mismatches between the AM and AO domains.

Figure 22:
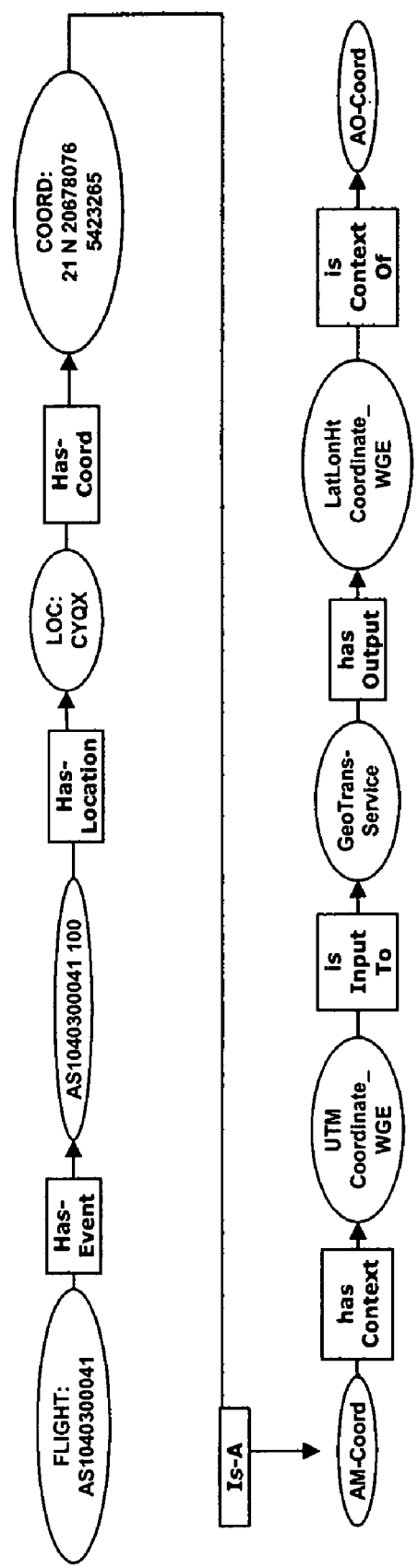
FIG. 22 is an example of a workflow returned by the Semantic Viewer after processing an initial workflow with the Onto-Mapper to resolve mismatches.

An example of such a workflow is shown in FIG. 22. A quick scan of this workflow reveals the pathway that will be executed by the GeoTrans web service to derive the instance value of AO-COORD from COORD: 21 N 20678076 5423265 (an instance of AM-COORD). In addition to the example workflow, the Semantic Viewer finds additional workflows for other instances of AM-COORD that need translation. Although not presented in the example, workflows are discovered for representational mismatches between the Time and Type of Things context ontologies in a similar fashion.

The Semantic Viewer processes the workflow on a node-by-node basis. In the example workflow of FIG. 22, the first node is AM-FLIGHT-AS1040300041, followed by AS1040300041 100, LOC:CYQX, AM COORD 21 N 20678076 5423265, and UTMCoordinate-WGE. Since AM-COORD 21 N 20678076 5423265 inherits the hasContext link to UTMCoordinate-WGE from AM-COORD, the Semantic Viewer makes AM-COORD 21 N 20678076 5423265 an instance of UTMCOORDINATE-WGE. This process links AM-COORD 21 N 20678076 5423265 to GeoTrans using InputOf, and it indicates that the GeoTrans web services must be invoked to translate between the AM and AO systems. Further, since hasOutput links LATLONHT-COORDINATE-WGE to the GeoTrans web service, the resulting output of GeoTrans is an instance of LATLONHT-COORDINATE-WGE. The processing of the isTheContextOf link makes the instance of LATLONHTCOORDI-NATE-WGE an instance of AO-COORD.

The translation step first requires the construction of the URL necessary to invoke the GeoTrans web service. The base URL and parameter names are read from the WSDL ontology, and the parameter values are inferred from the mapped ontology. Specifically, when execution of GeoTrans is requested, its full definition is retrieved from the ontology management system, and the base URL, http://base.mitre.org/Geotrans/, is retrieved from the GeoTrans WSDL ontology. Then for each object of inParameter (e.g. COORDREFFRAME), the Semantic Viewer runs the DPQ with input "COORD: 21 N 20678076 5423265" and with output being the object of inParameter (e.g. COORDREFFRAME).

Figure 23:
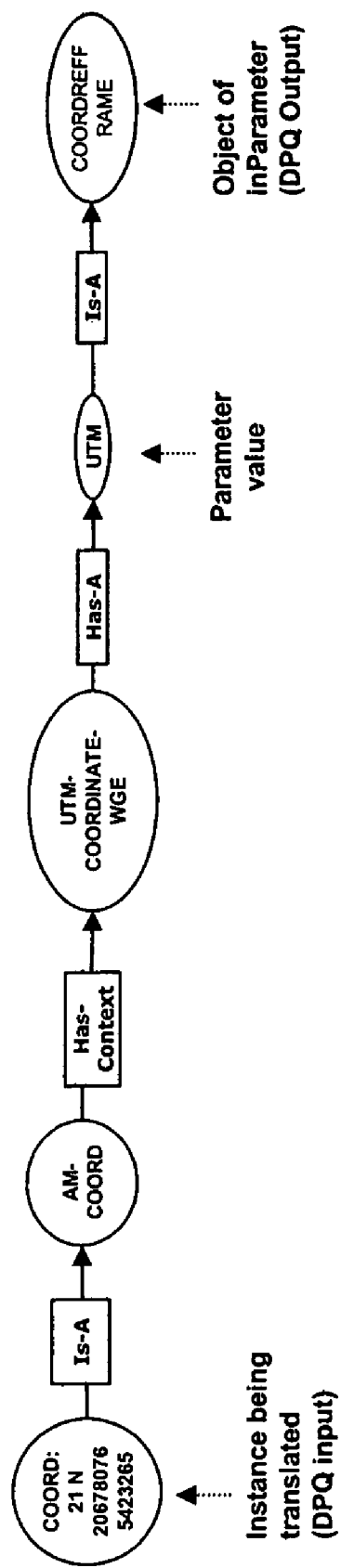
FIG. 23 is an example of a preliminary workflow returned during the execution of the GeoTrans web service.

FIG. 23 illustrates an example of a path returned from the DPQ. The path contains the parameter value to be used in the URL for that object of inParameter (e.g. COORDREF-FRAME). This parameter value is identified in the returned path as the instance of the object of inParameter (e.g., COOR-DREFFRAME). For example, the value of COORDREF-FRAME value is UTM for the example pathway in FIG. 23. The parameter name is then determined by following the link isValueOf, which reveals the label of the parameter name (inputCRF). When the Semantic Viewer has processed all inParameter links, the resulting URL will take the form:

http://base.mitre.org/Geotrans/inputCRF=UTM &inputDatum=WGE&CoordString=21 N 20678076 5423265

Once all of the objects of each inParameter are processed, the Semantic Viewer turns its attention to outParameter. Similar to the processing for inParameter, the Semantic Viewer repeatedly runs the DPQ with input "COORD: 21 N 20678076 5423265" and output being each object of outParameter (e.g., COORDREFFRAME). It then finds the matching parameter label using the isValueOf link. The complete URL is of the form:

http://base.mitre.org/Geotrans/inputCRF=UTM &inputDatum=WGE&CoordString=21N206780 765423265&outputCRF=Geodetic&outputDatu m=WGE.

When the invocation of GeoTrans returns the XML document, the Semantic Viewer translates it into an RDF instance of AO-COORD, i.e., AO-COORD: 48.936668,-54.568333. Elements in the XML document are first matched with concepts in the WSDL ontology. The latter are linked to the mapped ontology using the isValueOf and isOutputValueOf links. This creates a LATLONHTCOORDINATE-WGE instance from the XML document. The Semantic Viewer then completes the workflow processing by reclassifying the LAT-LONHTCOORDINATE-WGE instance as an AO-COORD due to the isTheContextOf link between LATLONHTCOOR-DINATE-WGE and AO-COORD. The Semantic Viewer also creates an isCorrelatedWith link is between AM-COORD: 21 N 20678076 5423265 and AO-COORD: 48.936668,-54.568333.

Figure 25:
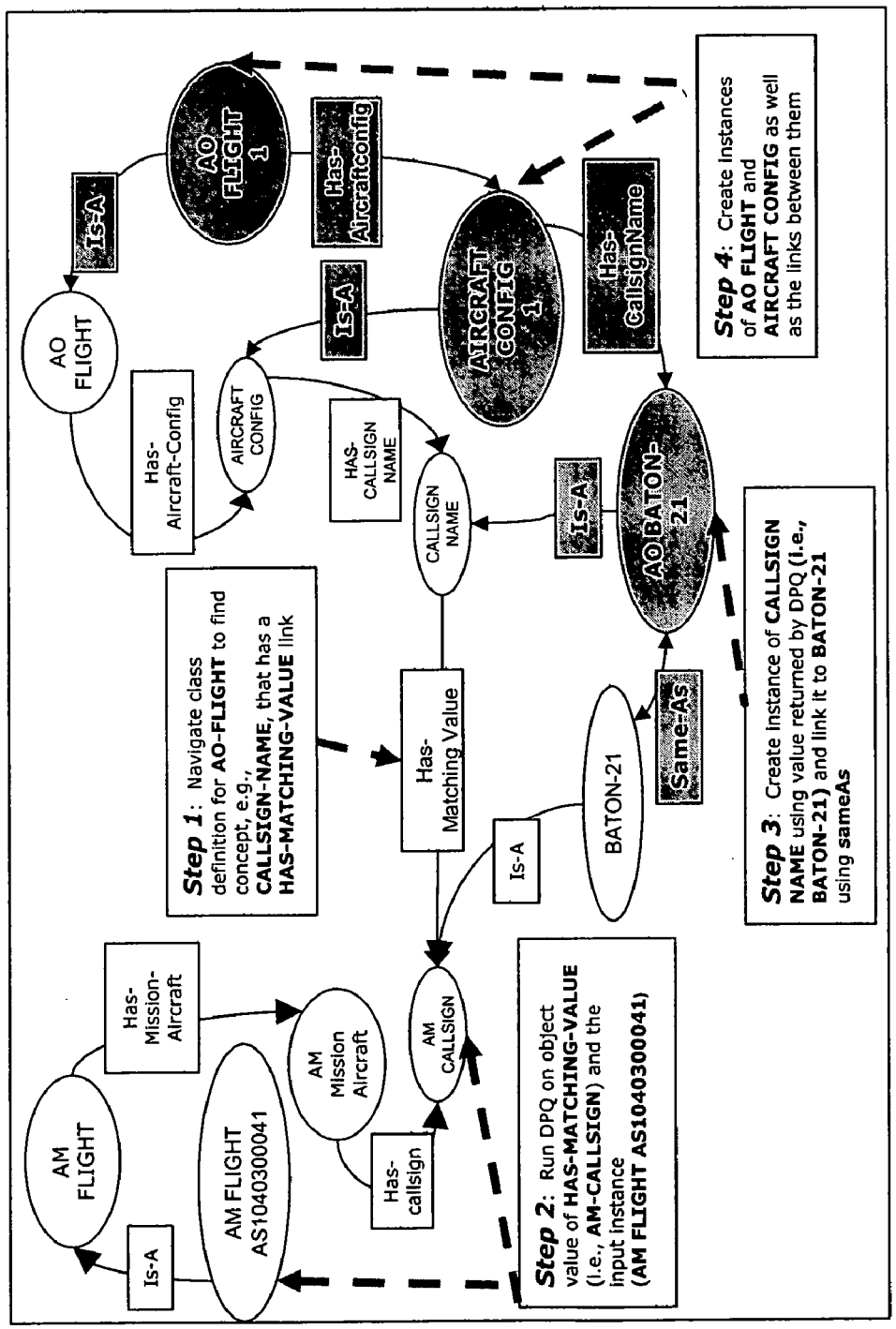
FIG. 25 is a schematic diagram outlining the creation of a new data instance on the AO information system ontology using the hasMatchingValue link.
Figure 26:
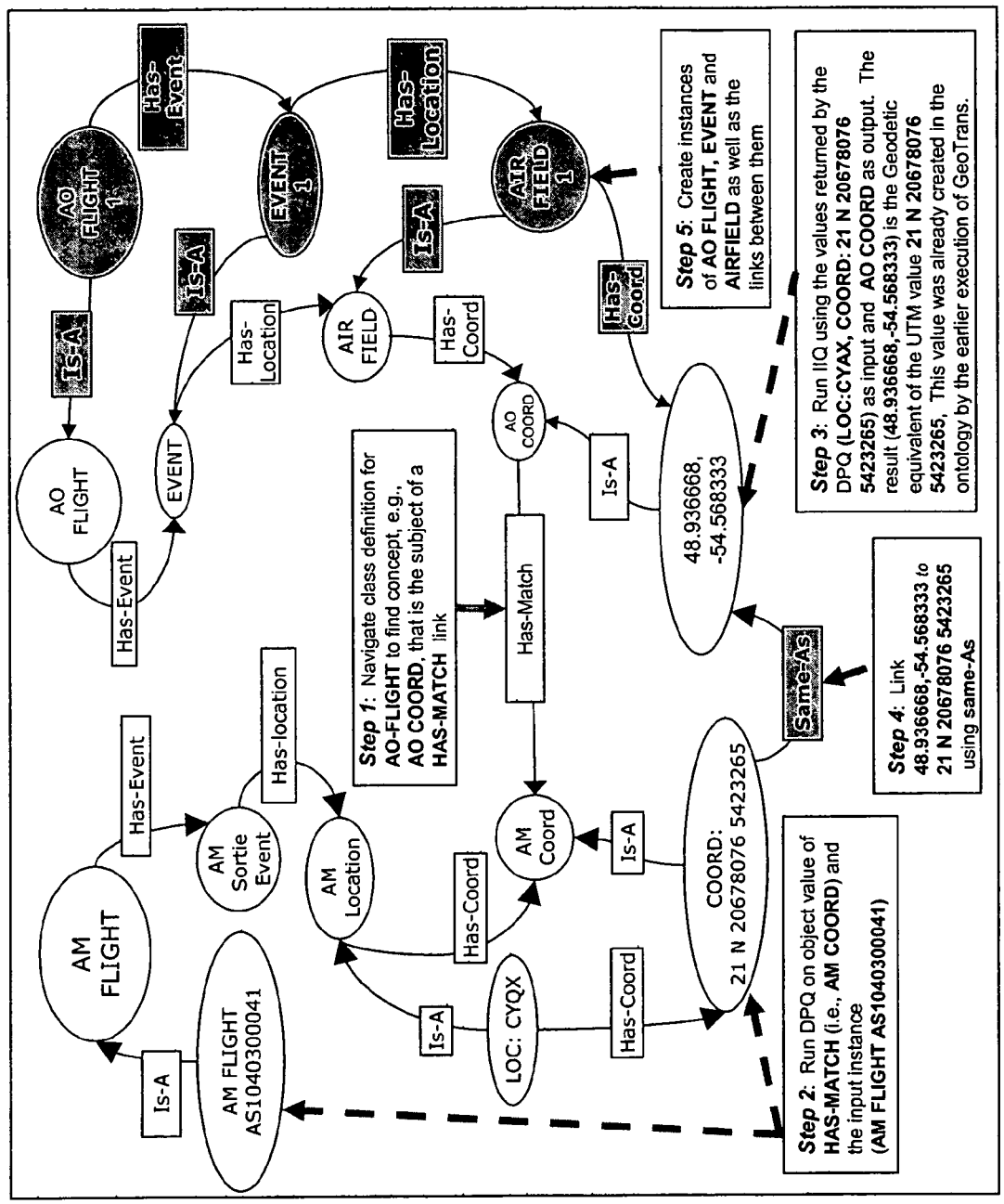
FIG. 26 is a schematic diagram outlining the creation of new data instance on the AO information system ontology using the hasMatch link.

Once these workflows are executed, the algorithm presented in FIG. 24 creates a new data instance in AO domain. This new instance is then linked to the AM instance AM FLIGHT AS1040300041 using the isCorrelatedWith link and imported to the ontology management service. To help the reader understand this algorithm, notional representations of the processing for the hasMatchingValue and hasMatch relationships are depicted in FIG. 25 and FIG. 26, respectively.

In the above examples, a single input data instance on the AM information system was input into the Semantic Viewer, and a single corresponding data instance in the AO information system was created. The algorithms of the present invention may be generalized to return multiple initial workflows that corresponding to multiple, input data instances.

Figure 27:
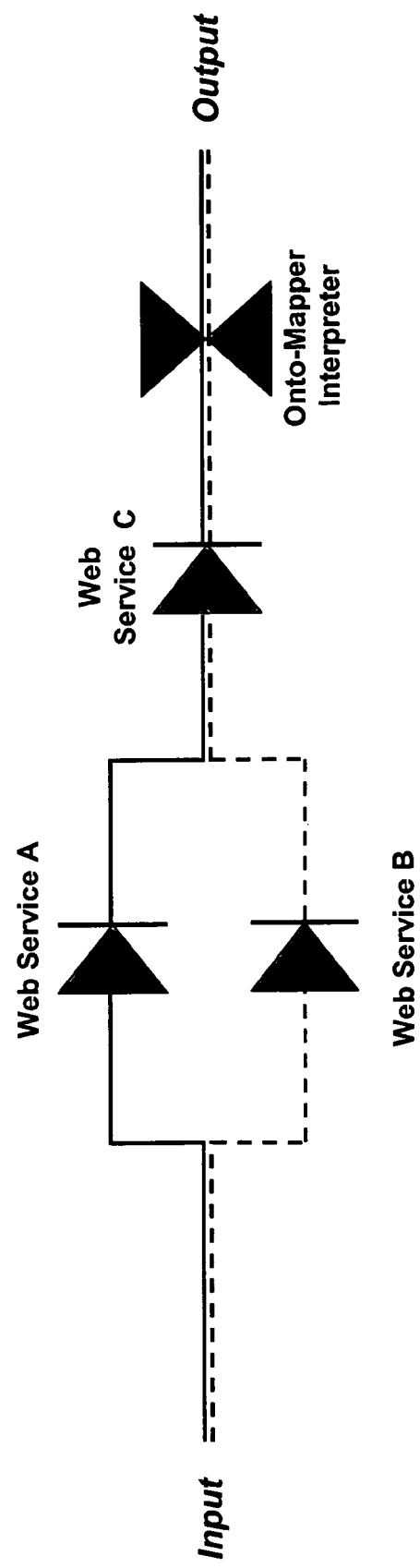
FIG. 27 is an example of a generalized execution path containing multiple workflows.

FIG. 27 illustrates a case in which the outputs from the execution of multiple web services serve as necessary inputs to future chained web services. In FIG. 27, the first workflow is composed of the sequenced web service A, followed web service C, and finally followed by the Onto-Mapper. The execution of A succeeds and its result is stored in the ontology management system. However, the execution of C fails, since the output of web service B is needed as input to web service C. The system proceeds to execute the second workflow, i.e., web service B, followed web service C, and finally followed by the Onto-Mapper. This workflow successfully completes since the necessary output from A was stored and is currently available.

The present approach, as described by the above example, is also extensible. The previous examples concentrate on the mapping of a number of information system ontologies to a number of context ontologies of a fixed size. The invention also allows the incorporation of new context ontologies and the extension of existing context ontologies without any modification to existing mappings. In this fashion, a given context ontology may be extended to account for conceptual representations in a larger number of existing information systems. Further, new context ontologies and mappings may be created to embrace additional enterprise concepts without modifying the mapping of existing context ontologies to information systems.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method comprising:
providing two or more distinct information systems, each information system containing an information system ontology and corresponding information system data model;
providing a context ontology, the context ontology capturing common concepts and relating the various representations of a common concept within the concepts in the distinct information system ontologies;
mapping the concepts of each of the two or more information system ontologies to each other and to the concepts within the context ontology;
mapping a translator web service ontology representing a translator web service having one or more structured inputs and outputs to the context ontology to create an augmented ontology;
providing a service agent to interpret mappings and to reason with mapped ontologies;
specifying one or more data instances from a source information system of the distinct information systems as inputs to the translator web service;
specifying one or more concepts on a target information system of the distinct information systems as outputs to the translator web service;
searching the mapped ontologies for an execution path between the one or more desired input data instances on the source information system and the corresponding output concepts on the target information system, the execution path traversing through concepts of the translator web service ontology; and
generating executable code that accepts one or more desired input data instances from a source information system and invokes the execution path to create the corresponding output data instance in the specified target information system.

2. The method of claim 1, wherein said context ontology captures at least one of the commonly held Position, Time, Types of Things, Geometric Shapes, Roles, Status, or Units of Measure concepts.

3. The method of claim 1, wherein said provided information systems also comprise an associated information system web service.

4. The method of claim 1, wherein said service agent is an Ontology Mapper, an Onto-Mapper, or a Mapping Interpreter.

5. The method of claim 1, wherein said service agent is automatically invoked by the translator web service.

6. The method of claim 1, wherein searching the mapped ontologies for an execution path further comprises:
mapping the source information system data model onto the source information system ontology; and
invoking the translator web service to return an execution path between the input data instances on the source information system and the corresponding output concepts on the target information systems.

7. The method of claim 6, wherein invoking the translator web service to return an execution path between the input data instances on a source information system and the corresponding output representations on a target information system comprises:
determining an initial execution path between data instances on the source information system and the corresponding concepts on the target information system; and
invoking the service agent, wherein the service agent discovers and resolves mismatches between the source and target information systems and returns an execution path between the source data instance and the target concept.

8. The method of claim 7, wherein said initial execution path is determined using graph traversal algorithms.

9. The method of claim 7, wherein said service agent resolves any combination of contextual or semantic mismatches between source and target information systems.

10. The method of claim 1, wherein generating executable code further comprises:
invoking the execution path to obtain a target concept that contextually matches a source data instance; and
reasoning with the various representations of the common concept within the concepts on the target information system ontology to create a target data instance that contextually matches the source data instance.

11. A system comprising:
a first information system associated with a first ontology comprising a first representation of a common concept;
a second information system associated with a second ontology comprising a second representation of the common concept, wherein the second representation is distinct from the first representation;
a web service ontology describing concepts and relationships of an interface for a web service;
a service agent configured to map concepts from the first ontology, the second ontology, a context ontology capturing the common concept, and the web service ontology to each other to create an augmented ontology; and
a computing device configured to:
search the augmented ontology for an execution path between an input to the first information system and a desired output from the second information system, the execution path traversing through concepts of the web service ontology, and
generate executable code that accepts the input and invokes the execution path to produce the desired output.

12. A method comprising:
creating a context ontology capturing a common concept from a first ontology and a second ontology;
relating a first representation of the common concept from the first ontology to a second representation of the common concept from the second ontology, wherein the first representation and the second representation are distinct;
providing a web service ontology describing the concepts and relationships of a web service interface;
mapping concepts from the first ontology, the second ontology, the context ontology and the domain ontology to each other to create an augmented ontology;
searching the augmented ontology for an execution path between an input to the first ontology and a desired output from the second ontology, the execution path traversing through concepts of the web service ontology; and
generating executable code that accepts the input and invokes the execution path to produce the desired output.

13. The system of claim 11, wherein the context ontology captures at least one of the commonly held Position, Time, Types of Things, Geometric Shapes, Roles, Status, or Units of Measure concepts.

14. The system of claim 11, further comprising an associated information system web service.

15. The system of claim 11, wherein the service agent is an Ontology Mapper, an Onto-Mapper, or a Mapping Interpreter.

16. The system of claim 11, wherein the service agent is configured to be automatically invoked by the web service.

17. The system of claim 11, wherein the computing device is configured to search the augmented ontology for an execution path using graph traversal algorithms.

18. The system of claim 11, wherein the service agent is configured to resolve any combination of contextual or semantic mismatches between the first and second information systems.

19. The system of claim 11, wherein the computing device is further configured to:
invoke the execution path to obtain a target concept, corresponding to the desired output, that contextually matches a source data instance; and
reason with the first and second representations of the common concept to create a target data instance that contextually matches the source data instance.

* * * * *